US012776225B2

(12) United States Patent
Black et al.

(10) Patent No.: US 12,776,225 B2
(45) **Date of Patent: *Oct. 27, 2026**

(54) FIRST ENTRY MODEL

(71) Applicant: Applied Medical Resources Corporation, Rancho Santa Margarita, CA (US)

(72) Inventors: Katie Black, Ladera Ranch, CA (US); Nikolai Poulsen, Irvine, CA (US); Heidi Holmes, Rancho Santa Margarita, CA (US); Natasha Felsinger, Trabuco Canyon, CA (US); Tracy Breslin, Trabuco Canyon, CA (US); Kennii Pravongviengkham, Rancho Santa Margartia, CA (US); Boun Pravong, Rancho Santa Margarita, CA (US); Eduardo Bolanos, Rancho Santa Margarita, CA (US); Zoran Falkenstein, Rancho Santa Margarita, CA (US); Charles C. Hart, Rancho Santa Margarita, CA (US); Tina Talwar, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 18/392,509

(22) Filed: Dec. 21, 2023

(65) Prior Publication Data

US 2024/0127714 A1 Apr. 18, 2024

Related U.S. Application Data

(63) Continuation of application No. 16/878,291, filed on May 19, 2020, now Pat. No. 11,854,425, which is a (Continued)

(51) Int. Cl.
*G09B 23/30* (2006.01)
*B29C 39/02* (2006.01)
(Continued)

(52) U.S. Cl.
CPC .......... *G09B 23/285* (2013.01); *B29C 39/026* (2013.01); *G09B 5/02* (2013.01); *B29K 2083/005* (2013.01); *B29L 2031/7532* (2013.01)

(58) Field of Classification Search
CPC ......... G09B 23/28; G09B 23/30; G09B 23/34
See application file for complete search history.

(56) References Cited

U.S. PATENT DOCUMENTS 184,573 A 11/1876 Becker
2,127,774 A 8/1938 Jacobs
(Continued)

FOREIGN PATENT DOCUMENTS

CA 2 293 585 A1 12/1998
CN 2421706 Y 2/2001
(Continued)

OTHER PUBLICATIONS

European Patent Office, Extended European Search Report for European Patent Application No. 23180886.6, titled "Simulated Dissectible Tissue," dated Dec. 21, 2023, 14 pgs.
(Continued)

*Primary Examiner* — Kurt Fernstrom
(74) *Attorney, Agent, or Firm* — Shirin Bozorgui; Patrick Ikehara

(57) ABSTRACT

A simulated abdominal wall model that is ideal for practicing laparoscopic first entry surgical techniques is provided. The model includes a simulated abdominal wall portion captured between two frame elements of a support. The support is connectable to a surgical trainer. When connected (Continued)

to the trainer, the model provides a penetrable abdominal tissue portion for accessing an internal cavity of the trainer. The simulated abdominal wall includes a plurality of layers including a skin layer, a fabric posterior rectus sheath layer, a simulated fat layer of low-resilience polyurethane foam and at least two layers that provide distinctive haptic feedback upon penetration of the simulated *transversalis* fascia and muscle layers. The simulated abdominal wall includes a simulated umbilicus across several layers of simulated tissue.

20 Claims, 10 Drawing Sheets

Related U.S. Application Data continuation of application No. 16/030,696, filed on Jul. 9, 2018, now Pat. No. 10,657,845, which is a continuation of application No. 15/370,231, filed on Dec. 6, 2016, now Pat. No. 10,026,337, which is a continuation of application No. 14/340,234, filed on Jul. 24, 2014, now Pat. No. 9,548,002.

(60) Provisional application No. 61/971,714, filed on Mar. 28, 2014, provisional application No. 61/857,982, filed on Jul. 24, 2013.

(51) Int. Cl.

| | |
|---|---|
| ***G09B 5/02*** | (2006.01) |
| ***G09B 23/28*** | (2006.01) |
| *B29K 83/00* | (2006.01) |
| *B29L 31/00* | (2006.01) |

(56) References Cited

U.S. PATENT DOCUMENTS 2,284,888 A 6/1942 Arnell, Jr.
2,324,702 A 7/1943 Hoffman et al.
2,345,489 A 3/1944 Lord
2,495,568 A 1/1950 Coel
3,339,290 A * 9/1967 Doyle .................. G09B 23/285 434/267
3,766,666 A 10/1973 Stroop
3,775,865 A 12/1973 Rowan
3,789,518 A 2/1974 Chase
3,921,311 A 11/1975 Beasley et al.
3,991,490 A 11/1976 Markman
4,001,951 A 1/1977 Fasse
4,001,952 A 1/1977 Kleppinger
4,321,047 A 3/1982 Landis
4,323,350 A 4/1982 Bowden, Jr.
4,332,569 A 6/1982 Burbank
4,371,345 A 2/1983 Palmer et al.
4,386,917 A 6/1983 Forrest
4,459,113 A 7/1984 Boscaro Gatti et al.
4,481,001 A * 11/1984 Graham ............... G09B 23/285 434/267
4,596,528 A 6/1986 Lewis et al.
4,726,772 A 2/1988 Amplatz
4,737,109 A 4/1988 Abramson
4,789,340 A 12/1988 Zikria
4,832,978 A 5/1989 Lesser
4,867,686 A 9/1989 Goldstein
4,907,973 A 3/1990 Hon
4,938,696 A 7/1990 Foster et al.
4,940,412 A 7/1990 Blumenthal
5,061,187 A 10/1991 Jerath
5,083,962 A 1/1992 Pracas
5,104,328 A 4/1992 Lounsbury
5,149,270 A 9/1992 McKeown
5,180,308 A 1/1993 Garito et al.
5,230,630 A 7/1993 Burgett
5,273,435 A 12/1993 Jacobson
5,295,694 A 3/1994 Levin
5,310,348 A 5/1994 Miller
5,318,448 A 6/1994 Garito et al.
5,320,537 A 6/1994 Watson
5,358,408 A 10/1994 Medina
5,368,487 A 11/1994 Medina
5,380,207 A 1/1995 Siepser
5,403,191 A 4/1995 Tuason
5,425,644 A 6/1995 Szinicz
5,425,731 A 6/1995 Daniel et al.
5,472,345 A 12/1995 Eggert
5,518,406 A * 5/1996 Waters ................. G09B 23/285 434/272
5,518,407 A 5/1996 Greenfield et al.
5,520,633 A 5/1996 Costin
5,541,304 A 7/1996 Thompson
5,620,326 A 4/1997 Younker
5,720,742 A 2/1998 Zacharias
5,722,836 A 3/1998 Younker
5,727,948 A 3/1998 Jordan
5,743,730 A 4/1998 Clester et al.
5,762,458 A 6/1998 Wang et al.
5,769,640 A 6/1998 Jacobus et al.
5,775,916 A 7/1998 Cooper et al.
5,785,531 A 7/1998 Leung
5,800,178 A 9/1998 Gillio
5,803,746 A 9/1998 Barrie et al.
5,807,378 A 9/1998 Jensen et al.
5,810,880 A 9/1998 Jensen et al.
5,814,038 A 9/1998 Jensen et al.
5,850,033 A 12/1998 Mirzeabasov et al.
5,855,583 A 1/1999 Wang et al.
5,873,732 A 2/1999 Hasson
5,873,863 A 2/1999 Komlosi
5,908,302 A * 6/1999 Goldfarb .............. G09B 23/285 40/446
5,947,743 A 9/1999 Hasson
5,951,301 A 9/1999 Younker
6,080,181 A 6/2000 Jensen et al.
6,083,008 A 7/2000 Yamada et al.
6,113,395 A 9/2000 Hon
6,234,804 B1 5/2001 Yong
6,271,278 B1 8/2001 Park et al.
6,336,812 B1 1/2002 Cooper et al.
6,398,557 B1 6/2002 Hoballah
6,413,264 B1 7/2002 Jensen et al.
6,474,993 B1 11/2002 Grund et al.
6,485,308 B1 11/2002 Goldstein
6,488,507 B1 12/2002 Stoloff et al.
6,497,902 B1 12/2002 Ma
6,511,325 B1 1/2003 Lalka et al.
6,517,354 B1 2/2003 Levy
6,568,941 B1 5/2003 Goldstein
6,589,057 B1 7/2003 Keenan et al.
6,620,174 B2 9/2003 Jensen et al.
6,654,000 B2 11/2003 Rosenberg
6,659,776 B1 12/2003 Aumann et al.
6,773,263 B2 8/2004 Nicholls et al.
6,780,016 B1 8/2004 Toly
6,817,973 B2 11/2004 Merril et al.
6,820,025 B2 11/2004 Bachmann et al.
6,854,976 B1 2/2005 Suhr
6,857,878 B1 2/2005 Chosack et al.
6,863,536 B1 3/2005 Fisher et al.
6,866,514 B2 3/2005 Von Roeschlaub et al.
6,887,082 B2 5/2005 Shun
6,929,481 B1 8/2005 Alexander et al.
6,939,138 B2 9/2005 Chosack et al.
6,950,025 B1 9/2005 Nguyen
6,960,617 B2 11/2005 Omidian et al.
6,997,719 B2 2/2006 Wellman et al.
7,008,232 B2 3/2006 Brassel
7,018,327 B1 3/2006 Conti
7,025,064 B2 4/2006 Wang et al.
7,056,123 B2 6/2006 Gregorio et al.
7,080,984 B1 7/2006 Cohen
7,118,582 B1 10/2006 Wang et al.

(56) References Cited

U.S. PATENT DOCUMENTS

| | | | | |
|---|---|---|---|---|
| 7,255,565 | B2 | 8/2007 | Keegan | |
| 7,269,532 | B2 | 9/2007 | David et al. | |
| 7,272,766 | B2 | 9/2007 | Sakezles | |
| 7,300,450 | B2 | 11/2007 | Vleugels et al. | |
| 7,364,582 | B2 | 4/2008 | Lee | |
| 7,404,716 | B2 | 7/2008 | Gregorio et al. | |
| 7,419,376 | B2 | 9/2008 | Sarvazyan et al. | |
| 7,427,199 | B2 | 9/2008 | Sakezles | |
| 7,431,189 | B2 | 10/2008 | Shelton, IV et al. | |
| 7,441,684 | B2 | 10/2008 | Shelton, IV et al. | |
| 7,465,168 | B2 | 12/2008 | Allen et al. | |
| 7,467,075 | B2 | 12/2008 | Humphries et al. | |
| 7,544,062 | B1 | 6/2009 | Hauschild et al. | |
| 7,549,866 | B2 | 6/2009 | Cohen et al. | |
| 7,553,159 | B1 | 6/2009 | Arnal et al. | |
| 7,575,434 | B2 | 8/2009 | Palakodeti | |
| 7,594,815 | B2 | 9/2009 | Toly | |
| 7,621,749 | B2 | 11/2009 | Munday | |
| 7,646,901 | B2 | 1/2010 | Murphy et al. | |
| 7,648,367 | B1 | 1/2010 | Makower et al. | |
| 7,648,513 | B2 | 1/2010 | Green et al. | |
| 7,651,332 | B2 | 1/2010 | Dupuis et al. | |
| 7,677,897 | B2 | 3/2010 | Sakezles | |
| 7,775,916 | B1 | 8/2010 | Mahoney | |
| 7,780,451 | B2 | 8/2010 | Willobee et al. | |
| 7,802,990 | B2 | 9/2010 | Korndorffer et al. | |
| 7,803,151 | B2 | 9/2010 | Whitman | |
| 7,806,696 | B2 | 10/2010 | Alexander et al. | |
| 7,819,799 | B2 | 10/2010 | Merril et al. | |
| 7,833,018 | B2 | 11/2010 | Alexander et al. | |
| 7,837,473 | B2 | 11/2010 | Koh | |
| 7,850,454 | B2 | 12/2010 | Toly | |
| 7,850,456 | B2 | 12/2010 | Chosack et al. | |
| 7,854,612 | B2 | 12/2010 | Frassica et al. | |
| 7,857,626 | B2 | 12/2010 | Toly | |
| 7,866,983 | B2 | 1/2011 | Hemphill et al. | |
| 7,931,470 | B2 | 4/2011 | Alexander et al. | |
| 7,931,471 | B2 * | 4/2011 | Senagore ............. | G09B 23/285 434/267 |
| 7,988,992 | B2 | 8/2011 | Omidian et al. | |
| 7,993,140 | B2 | 8/2011 | Sakezles | |
| 7,997,903 | B2 | 8/2011 | Hasson et al. | |
| 8,007,281 | B2 | 8/2011 | Toly | |
| 8,007,282 | B2 | 8/2011 | Gregorio et al. | |
| 8,016,818 | B2 | 9/2011 | Ellis et al. | |
| 8,017,107 | B2 | 9/2011 | Thomas et al. | |
| 8,021,162 | B2 | 9/2011 | Sui | |
| 8,048,088 | B2 | 11/2011 | Green et al. | |
| 8,083,691 | B2 | 12/2011 | Goldenberg et al. | |
| 8,116,847 | B2 | 2/2012 | Gattani et al. | |
| 8,137,110 | B2 | 3/2012 | Sakezles | |
| 8,157,145 | B2 | 4/2012 | Shelton, IV et al. | |
| 8,197,464 | B2 | 6/2012 | Krever et al. | |
| 8,205,779 | B2 | 6/2012 | Ma et al. | |
| 8,221,129 | B2 | 7/2012 | Parry et al. | |
| 8,297,982 | B2 * | 10/2012 | Park ...................... | G09B 23/34 434/262 |
| 8,308,817 | B2 | 11/2012 | Egilsson et al. | |
| 8,323,028 | B2 | 12/2012 | Matanhelia | |
| 8,323,029 | B2 | 12/2012 | Toly | |
| 8,328,560 | B2 | 12/2012 | Niblock et al. | |
| 8,342,851 | B1 | 1/2013 | Speeg et al. | |
| 8,403,674 | B2 | 3/2013 | Feygin et al. | |
| 8,403,675 | B2 | 3/2013 | Stoianovici et al. | |
| 8,403,676 | B2 | 3/2013 | Frassica et al. | |
| 8,408,920 | B2 | 4/2013 | Speller | |
| 8,425,234 | B2 | 4/2013 | Sakezles | |
| 8,439,687 | B1 | 5/2013 | Morriss et al. | |
| 8,442,621 | B2 | 5/2013 | Gorek et al. | |
| 8,454,368 | B2 | 6/2013 | Ault et al. | |
| 8,459,094 | B2 | 6/2013 | Yanni | |
| 8,459,520 | B2 | 6/2013 | Giordano et al. | |
| 8,460,002 | B2 | 6/2013 | Wang et al. | |
| 8,465,771 | B2 | 6/2013 | Wan et al. | |
| 8,469,715 | B2 | 6/2013 | Ambrozio | |
| 8,469,716 | B2 | 6/2013 | Fedotov et al. | |
| 8,480,407 | B2 | 7/2013 | Campbell et al. | |
| 8,480,408 | B2 | 7/2013 | Ishii et al. | |
| 8,491,309 | B2 | 7/2013 | Parry et al. | |
| 8,500,753 | B2 | 8/2013 | Green et al. | |
| 8,512,044 | B2 | 8/2013 | Sakezles | |
| 8,517,243 | B2 | 8/2013 | Giordano et al. | |
| 8,521,252 | B2 | 8/2013 | Diez | |
| 8,535,062 | B2 | 9/2013 | Nguyen | |
| 8,544,711 | B2 | 10/2013 | Ma et al. | |
| 8,556,635 | B2 | 10/2013 | Toly | |
| 8,608,483 | B2 | 12/2013 | Trotta et al. | |
| 8,613,621 | B2 | 12/2013 | Henderickson et al. | |
| 8,636,520 | B2 | 1/2014 | Iwasaki et al. | |
| D699,297 | S | 2/2014 | Bahsoun et al. | |
| 8,641,423 | B2 | 2/2014 | Gumkowski | |
| 8,647,125 | B2 | 2/2014 | Johns et al. | |
| 8,678,831 | B2 | 3/2014 | Trotta et al. | |
| 8,679,279 | B2 | 3/2014 | Thompson et al. | |
| 8,696,363 | B2 | 4/2014 | Gray et al. | |
| 8,708,213 | B2 | 4/2014 | Shelton, IV et al. | |
| 8,708,707 | B2 | 4/2014 | Hendrickson et al. | |
| 8,764,449 | B2 | 7/2014 | Rios et al. | |
| 8,764,452 | B2 | 7/2014 | Pravong et al. | |
| 8,800,839 | B2 | 8/2014 | Beetel | |
| 8,801,437 | B2 | 8/2014 | Mousques | |
| 8,801,438 | B2 | 8/2014 | Sakezles | |
| 8,807,414 | B2 | 8/2014 | Ross et al. | |
| 8,808,004 | B2 | 8/2014 | Misawa et al. | |
| 8,808,311 | B2 | 8/2014 | Heinrich et al. | |
| 8,814,573 | B2 | 8/2014 | Nguyen | |
| 8,827,988 | B2 | 9/2014 | Belson et al. | |
| 8,840,628 | B2 | 9/2014 | Green et al. | |
| 8,870,576 | B2 | 10/2014 | Millon et al. | |
| 8,888,498 | B2 | 11/2014 | Bisaillon et al. | |
| 8,893,946 | B2 | 11/2014 | Boudreaux et al. | |
| 8,911,238 | B2 | 12/2014 | Forsythe | |
| 8,915,742 | B2 | 12/2014 | Hendrickson et al. | |
| 8,945,095 | B2 | 2/2015 | Blumenkranz et al. | |
| 8,961,190 | B2 | 2/2015 | Hart et al. | |
| 8,966,954 | B2 | 3/2015 | Ni et al. | |
| 8,968,003 | B2 | 3/2015 | Hendrickson et al. | |
| 9,008,989 | B2 | 4/2015 | Wilson et al. | |
| 9,017,080 | B1 | 4/2015 | Placik | |
| 9,026,247 | B2 | 5/2015 | White | |
| 9,050,201 | B2 | 6/2015 | Egilsson et al. | |
| 9,056,126 | B2 | 6/2015 | Hersel et al. | |
| 9,070,306 | B2 | 6/2015 | Rappel et al. | |
| 9,087,458 | B2 | 7/2015 | Shim et al. | |
| 9,096,744 | B2 | 8/2015 | Wan et al. | |
| 9,117,377 | B2 | 8/2015 | Shim et al. | |
| 9,119,572 | B2 | 9/2015 | Gorek et al. | |
| 9,123,261 | B2 | 9/2015 | Lowe | |
| 9,129,054 | B2 | 9/2015 | Nawana et al. | |
| 9,196,176 | B2 | 11/2015 | Hager et al. | |
| 9,226,799 | B2 | 1/2016 | Lightcap et al. | |
| 9,257,055 | B2 | 2/2016 | Endo et al. | |
| 9,265,587 | B2 | 2/2016 | Vancamberg et al. | |
| 9,295,468 | B2 | 3/2016 | Heinrich et al. | |
| 9,336,694 | B2 | 5/2016 | Shim et al. | |
| 9,351,714 | B2 | 5/2016 | Ross et al. | |
| 9,358,682 | B2 | 6/2016 | Ruiz Morales | |
| 9,364,224 | B2 | 6/2016 | Nicholas et al. | |
| 9,364,279 | B2 | 6/2016 | Houser et al. | |
| 9,370,361 | B2 | 6/2016 | Viola et al. | |
| 9,373,270 | B2 | 6/2016 | Miyazaki | |
| 9,387,276 | B2 | 7/2016 | Sun et al. | |
| 9,427,496 | B2 | 8/2016 | Sun et al. | |
| 9,439,649 | B2 | 9/2016 | Shelton, IV et al. | |
| 9,439,733 | B2 | 9/2016 | Ha et al. | |
| 9,449,532 | B2 | 9/2016 | Black et al. | |
| 9,468,438 | B2 | 10/2016 | Baber et al. | |
| 2001/0019818 | A1 | 9/2001 | Yong | |
| 2002/0168619 | A1 | 11/2002 | Provenza | |
| 2003/0031993 | A1 | 2/2003 | Pugh | |
| 2003/0091967 | A1 | 5/2003 | Chosack et al. | |
| 2003/0176770 | A1 | 9/2003 | Merril et al. | |
| 2004/0005423 | A1 | 1/2004 | Dalton et al. | |
| 2004/0126746 | A1 | 7/2004 | Toly | |

(56) References Cited

U.S. PATENT DOCUMENTS

2004/0248072 A1 12/2004 Gray et al.
2005/0008997 A1 1/2005 Herman
2005/0026125 A1 2/2005 Toly
2005/0064378 A1 3/2005 Toly
2005/0084833 A1 4/2005 Lacey et al.
2005/0131390 A1 6/2005 Heinrich et al.
2005/0142525 A1 6/2005 Cotin et al.
2005/0192595 A1 9/2005 Green et al.
2005/0196739 A1 9/2005 Moriyama
2005/0196740 A1 9/2005 Moriyana
2005/0214727 A1 9/2005 Stoianovici et al.
2006/0046235 A1 3/2006 Alexander et al.
2006/0232664 A1 10/2006 Toly
2006/0252019 A1 11/2006 Burkitt et al.
2006/0275741 A1 12/2006 Chewning et al.
2007/0074584 A1 4/2007 Talarico et al.
2007/0077544 A1 4/2007 Lemperle et al.
2007/0078484 A1 4/2007 Talarico et al.
2007/0148626 A1 6/2007 Ikeda
2007/0166682 A1 7/2007 Yarin et al.
2007/0197895 A1 8/2007 Nycz et al.
2007/0225734 A1 9/2007 Bell et al.
2007/0238081 A1 10/2007 Koh
2007/0275359 A1 11/2007 Rotnes et al.
2008/0032272 A1 2/2008 Palakodeti
2008/0032273 A1 2/2008 Macnamara et al.
2008/0052034 A1 2/2008 David et al.
2008/0064017 A1 3/2008 Grundmeyer, III
2008/0076101 A1 3/2008 Hyde et al.
2008/0097501 A1 4/2008 Blier
2008/0108869 A1 5/2008 Sanders et al.
2008/0187895 A1 8/2008 Sakezles
2008/0188948 A1 8/2008 Flatt
2008/0299529 A1 12/2008 Schaller
2008/0317818 A1 12/2008 Griffith et al.
2009/0068627 A1 3/2009 Toly
2009/0142739 A1 6/2009 Wang et al.
2009/0142741 A1 6/2009 Ault et al.
2009/0143642 A1 6/2009 Takahashi et al.
2009/0176196 A1 7/2009 Niblock et al.
2009/0187079 A1 7/2009 Albrecht et al.
2009/0246747 A1 10/2009 Buckman, Jr.
2009/0298034 A1 12/2009 Parry et al.
2009/0314550 A1 12/2009 Layton
2010/0047752 A1 2/2010 Chan et al.
2010/0094312 A1 4/2010 Ruiz Morales et al.
2010/0099067 A1 4/2010 Agro
2010/0167248 A1 7/2010 Ryan
2010/0167249 A1 7/2010 Ryan
2010/0167250 A1 7/2010 Ryan et al.
2010/0167253 A1 7/2010 Ryan et al.
2010/0167254 A1 7/2010 Nguyen
2010/0196867 A1 8/2010 Geerligs et al.
2010/0204713 A1 8/2010 Ruiz Morales
2010/0209899 A1 8/2010 Park
2010/0248200 A1 9/2010 Ladak
2010/0258611 A1 10/2010 Smith et al.
2010/0273136 A1 10/2010 Kandasami et al.
2010/0279263 A1 11/2010 Duryea
2010/0285094 A1 11/2010 Gupta
2010/0324541 A1 12/2010 Whitman
2011/0020779 A1 1/2011 Hannaford et al.
2011/0046637 A1 2/2011 Patel et al.
2011/0046659 A1 2/2011 Ramstein et al.
2011/0087238 A1 4/2011 Wang et al.
2011/0091855 A1 4/2011 Miyazaki
2011/0137337 A1 6/2011 van den Dool et al.
2011/0200976 A1 8/2011 Hou et al.
2011/0207104 A1 8/2011 Trotta
2011/0218550 A1 9/2011 Ma
2011/0244436 A1 10/2011 Campo
2011/0269109 A2 11/2011 Miyazaki
2011/0281251 A1 11/2011 Mousques
2011/0301620 A1 12/2011 Di Betta et al.
2012/0015337 A1 1/2012 Hendrickson et al.
2012/0015339 A1 1/2012 Hendrickson et al.
2012/0016362 A1 1/2012 Heinrich et al.
2012/0028231 A1 2/2012 Misawa et al.
2012/0034587 A1 2/2012 Toly
2012/0045743 A1 2/2012 Misawa et al.
2012/0065632 A1 3/2012 Shadduck
2012/0082970 A1 4/2012 Pravong et al.
2012/0100217 A1 4/2012 Green et al.
2012/0115117 A1 5/2012 Marshall
2012/0115118 A1 5/2012 Marshall
2012/0116391 A1 5/2012 Houser et al.
2012/0148994 A1 6/2012 Hori et al.
2012/0164616 A1 6/2012 Endo et al.
2012/0165866 A1 6/2012 Kaiser et al.
2012/0172873 A1 7/2012 Artale et al.
2012/0179072 A1 7/2012 Kegreiss
2012/0202180 A1 8/2012 Stock et al.
2012/0264096 A1 10/2012 Taylor et al.
2012/0264097 A1 10/2012 Newcott et al.
2012/0282583 A1 11/2012 Thaler et al.
2012/0282584 A1 11/2012 Millon et al.
2012/0283707 A1 11/2012 Giordano et al.
2012/0288839 A1 11/2012 Crabtree
2012/0308977 A1 12/2012 Tortola
2013/0087597 A1 4/2013 Shelton, IV et al.
2013/0101973 A1 4/2013 Hoke et al.
2013/0105552 A1 5/2013 Weir et al.
2013/0116668 A1 5/2013 Shelton, IV et al.
2013/0157240 A1 6/2013 Hart et al.
2013/0171288 A1 7/2013 Harders
2013/0177890 A1 7/2013 Sakezles
2013/0192741 A1 8/2013 Trotta et al.
2013/0218166 A1 8/2013 Elmore
2013/0224709 A1 8/2013 Riojas et al.
2013/0245681 A1 9/2013 Straehnz et al.
2013/0253480 A1 9/2013 Kimball et al.
2013/0267876 A1 10/2013 Leckenby et al.
2013/0282038 A1 10/2013 Dannaher et al.
2013/0288216 A1 10/2013 Parry, Jr. et al.
2013/0302771 A1 11/2013 Alderete
2013/0324991 A1 12/2013 Clem et al.
2013/0324999 A1 12/2013 Price et al.
2014/0011172 A1 1/2014 Lowe
2014/0017651 A1 1/2014 Sugimoto et al.
2014/0030682 A1 1/2014 Thilenius
2014/0038151 A1 2/2014 Hart
2014/0051049 A1 2/2014 Jarc et al.
2014/0072941 A1 3/2014 Hendrickson et al.
2014/0087345 A1 3/2014 Breslin et al.
2014/0087346 A1 3/2014 Breslin et al.
2014/0087347 A1 3/2014 Tracy et al.
2014/0087348 A1 3/2014 Tracy et al.
2014/0088413 A1 3/2014 Von Bucsh et al.
2014/0093852 A1 4/2014 Poulsen et al.
2014/0093854 A1 4/2014 Poulsen et al.
2014/0099858 A1 4/2014 Hernandez
2014/0106328 A1 4/2014 Loor
2014/0107471 A1 4/2014 Haider et al.
2014/0156002 A1 6/2014 Thompson et al.
2014/0162016 A1 6/2014 Matsui et al.
2014/0170623 A1 6/2014 Jarstad et al.
2014/0186809 A1 7/2014 Hendrickson et al.
2014/0187855 A1 7/2014 Nagale et al.
2014/0200561 A1 7/2014 Ingmanson et al.
2014/0212861 A1 7/2014 Romano
2014/0220527 A1 8/2014 Li et al.
2014/0220530 A1 8/2014 Merkle et al.
2014/0220532 A1 8/2014 Ghez et al.
2014/0242564 A1 8/2014 Pravong et al.
2014/0246479 A1 9/2014 Baber et al.
2014/0248596 A1 9/2014 Hart et al.
2014/0263538 A1 9/2014 Leimbach et al.
2014/0272878 A1 9/2014 Shim et al.
2014/0272879 A1 9/2014 Shim et al.
2014/0275795 A1 9/2014 Little et al.
2014/0275981 A1 9/2014 Selover et al.
2014/0277017 A1 9/2014 Leimbach et al.
2014/0303643 A1 10/2014 Ha et al.
2014/0303646 A1 10/2014 Morgan et al.

(56) References Cited

U.S. PATENT DOCUMENTS

| | | | |
|---|---|---|---|
| 2014/0303660 | A1 | 10/2014 | Boyden et al. |
| 2014/0308643 | A1 | 10/2014 | Trotta et al. |
| 2014/0342334 | A1 | 11/2014 | Black et al. |
| 2014/0349266 | A1 | 11/2014 | Choi |
| 2014/0350530 | A1 | 11/2014 | Ross et al. |
| 2014/0357977 | A1 | 12/2014 | Zhou |
| 2014/0370477 | A1 | 12/2014 | Black et al. |
| 2014/0371761 | A1 | 12/2014 | Juanpera |
| 2014/0378995 | A1 | 12/2014 | Kumar et al. |
| 2015/0031008 | A1 | 1/2015 | Black et al. |
| 2015/0037773 | A1 | 2/2015 | Quirarte Catano |
| 2015/0038613 | A1 | 2/2015 | Sun et al. |
| 2015/0076207 | A1 | 3/2015 | Boudreaux et al. |
| 2015/0086955 | A1 | 3/2015 | Poniatowski et al. |
| 2015/0132732 | A1 | 5/2015 | Hart et al. |
| 2015/0132733 | A1 | 5/2015 | Garvik et al. |
| 2015/0135832 | A1 | 5/2015 | Blumenkranz et al. |
| 2015/0148660 | A1 | 5/2015 | Weiss et al. |
| 2015/0164598 | A1 | 6/2015 | Blumenkranz et al. |
| 2015/0187229 | A1 | 7/2015 | Wachli et al. |
| 2015/0194075 | A1 | 7/2015 | Rappel et al. |
| 2015/0202299 | A1 | 7/2015 | Burdick et al. |
| 2015/0209035 | A1 | 7/2015 | Zemlock |
| 2015/0209059 | A1 | 7/2015 | Trees et al. |
| 2015/0209573 | A1 | 7/2015 | Hibner et al. |
| 2015/0228206 | A1 | 8/2015 | Shim et al. |
| 2015/0262511 | A1 | 9/2015 | Lin et al. |
| 2015/0265431 | A1 | 9/2015 | Egilsson et al. |
| 2015/0272571 | A1 | 10/2015 | Leimbach et al. |
| 2015/0272574 | A1 | 10/2015 | Leimbach et al. |
| 2015/0272580 | A1 | 10/2015 | Leimbach et al. |
| 2015/0272581 | A1 | 10/2015 | Leimbach et al. |
| 2015/0272583 | A1 | 10/2015 | Leimbach et al. |
| 2015/0272604 | A1 | 10/2015 | Chowaniec et al. |
| 2015/0332609 | A1 | 11/2015 | Alexander |
| 2015/0358426 | A1 | 12/2015 | Kimball et al. |
| 2015/0371560 | A1 | 12/2015 | Lowe |
| 2015/0374378 | A1 | 12/2015 | Giordano et al. |
| 2015/0374449 | A1 | 12/2015 | Chowaniec et al. |
| 2016/0000437 | A1 | 1/2016 | Giordano et al. |
| 2016/0022374 | A1 | 1/2016 | Haider et al. |
| 2016/0030240 | A1 | 2/2016 | Gonenc et al. |
| 2016/0031091 | A1 | 2/2016 | Popovic et al. |
| 2016/0058534 | A1 | 3/2016 | Derwin et al. |
| 2016/0066909 | A1 | 3/2016 | Baber et al. |
| 2016/0070436 | A1 | 3/2016 | Thomas et al. |
| 2016/0073928 | A1 | 3/2016 | Soper et al. |
| 2016/0074103 | A1 | 3/2016 | Sartor |
| 2016/0098933 | A1 | 4/2016 | Reiley et al. |
| 2016/0104394 | A1 | 4/2016 | Miyazaki |
| 2016/0117956 | A1 | 4/2016 | Larsson et al. |
| 2016/0125762 | A1 | 5/2016 | Becker et al. |
| 2016/0133158 | A1 | 5/2016 | Sui et al. |
| 2016/0140876 | A1 | 5/2016 | Jabbour et al. |
| 2016/0194378 | A1 | 7/2016 | Cass et al. |
| 2016/0199059 | A1 | 7/2016 | Shelton, IV et al. |
| 2016/0220150 | A1 | 8/2016 | Sharonov |
| 2016/0220314 | A1 | 8/2016 | Huelman et al. |
| 2016/0225288 | A1 | 8/2016 | East et al. |
| 2016/0232819 | A1 | 8/2016 | Hofstetter et al. |
| 2016/0235494 | A1 | 8/2016 | Shelton, IV et al. |
| 2016/0256187 | A1 | 9/2016 | Shelton, IV et al. |
| 2016/0256229 | A1 | 9/2016 | Morgan et al. |
| 2016/0262736 | A1 | 9/2016 | Ross et al. |
| 2016/0262745 | A1 | 9/2016 | Morgan et al. |
| 2016/0293055 | A1 | 10/2016 | Hofstetter |
| 2016/0296144 | A1 | 10/2016 | Gaddam et al. |

FOREIGN PATENT DOCUMENTS

| | | | |
|---|---|---|---|
| CN | 2751372 | Y | 1/2006 |
| CN | 2909427 | Y | 6/2007 |
| CN | 101313842 | A | 12/2008 |
| CN | 101528780 | A | 9/2009 |
| CN | 201364679 | Y | 12/2009 |
| CN | 201955979 | U | 8/2011 |
| CN | 102458496 | A | 5/2012 |
| CN | 202443680 | U | 9/2012 |
| CN | 202563792 | U | 11/2012 |
| CN | 202601055 | U | 12/2012 |
| CN | 202694651 | U | 1/2013 |
| CN | 103050040 | A | 4/2013 |
| CN | 203013103 | U | 6/2013 |
| CN | 203038549 | U | 7/2013 |
| CN | 203338651 | U | 12/2013 |
| CN | 203397593 | U | 1/2014 |
| CN | 203562128 | U | 4/2014 |
| CN | 10388679 | A | 6/2014 |
| CN | 102596275 | B | 6/2014 |
| CN | 103845757 | A | 6/2014 |
| CN | 103396562 | B | 7/2015 |
| CN | 105194740 | A | 12/2015 |
| CN | 105504166 | A | 4/2016 |
| DE | 91 02 218 | U1 | 5/1991 |
| DE | 41 05 892 | | 8/1992 |
| DE | 93 20 422 | U1 | 6/1994 |
| DE | 44 14 832 | | 11/1995 |
| DE | 19716341 | | 9/2000 |
| EP | 1 024 173 | A1 | 8/2000 |
| EP | 0 990 227 | B1 | 4/2002 |
| EP | 1 609 431 | A1 | 12/2005 |
| EP | 0 870 292 | B1 | 7/2008 |
| EP | 2 068 295 | A2 | 6/2009 |
| EP | 2 218 570 | A1 | 8/2010 |
| FR | 2 691 826 | | 12/1993 |
| FR | 2 917 876 | | 12/2008 |
| GB | 2488994 | A | 9/2012 |
| JP | 10 211160 | | 8/1998 |
| JP | 2001005378 | A | 1/2001 |
| JP | 2006187566 | A | 7/2006 |
| JP | 2009063787 | A | 3/2009 |
| JP | 2009236963 | A | 10/2009 |
| JP | 3162161 | U | 8/2010 |
| JP | 2011113056 | A | 6/2011 |
| JP | 2013127496 | A | 6/2013 |
| KR | 101231565 | B1 | 2/2013 |
| MX | PA 02004422 | A | 11/2003 |
| PT | 106230 | | 9/2013 |
| WO | WO 94/06109 | | 3/1994 |
| WO | WO 96/42076 | | 2/1996 |
| WO | WO 98/58358 | | 12/1998 |
| WO | WO 1999/01074 | A1 | 1/1999 |
| WO | WO 2000/36577 | | 6/2000 |
| WO | WO 2002/38039 | A2 | 5/2002 |
| WO | WO 2002/038039 | A3 | 5/2002 |
| WO | WO 2004/032095 | | 4/2004 |
| WO | WO 2004/082486 | A1 | 9/2004 |
| WO | WO 2005/071639 | A1 | 8/2005 |
| WO | WO 2005/083653 | A1 | 9/2005 |
| WO | WO 2006/083963 | A2 | 8/2006 |
| WO | WO 2007/068360 | | 6/2007 |
| WO | WO 2008/021720 | A2 | 2/2008 |
| WO | WO 2008/103383 | A1 | 8/2008 |
| WO | WO 2009/000939 | | 12/2008 |
| WO | WO 2009/089614 | A1 | 7/2009 |
| WO | WO 2010/094730 | | 8/2010 |
| WO | WO 2011/035410 | A1 | 3/2011 |
| WO | WO 2011/046606 | A1 | 4/2011 |
| WO | WO 2011/127379 | A2 | 10/2011 |
| WO | WO 2011/151304 | A1 | 12/2011 |
| WO | WO 2012/149606 | A1 | 11/2012 |
| WO | WO 2012168287 | A1 | 12/2012 |
| WO | WO 2012175993 | | 12/2012 |
| WO | WO 2013/048978 | A1 | 4/2013 |
| WO | WO 2013/103956 | A1 | 7/2013 |
| WO | WO 2014/022815 | A1 | 2/2014 |
| WO | WO 2014/093669 | A1 | 6/2014 |
| WO | WO 2014/197793 | A1 | 12/2014 |
| WO | WO 2015/148817 | A1 | 10/2015 |
| WO | WO 2016/138528 | A1 | 9/2016 |
| WO | WO 2016/183412 | A1 | 11/2016 |
| WO | WO 2016/198238 | A1 | 12/2016 |

(56) References Cited

FOREIGN PATENT DOCUMENTS

| | | |
|---|---|---|
| WO | WO 2016/201085 A1 | 12/2016 |
| WO | WO 2017/031214 A1 | 2/2017 |
| WO | WO 2017/042301 A1 | 3/2017 |

OTHER PUBLICATIONS

European Patent Office, International Search Report for International Application No. PCT/US2011/053859 A3, mailed on May 4, 2012, entitled "Portable Laparoscopic Trainer".
European Patent Office, The International Search Report and Written Opinion for International Application No. PCT/US2012/60997, mailed Mar. 7, 2013, entitled "Simulated Tissue Structure for Surgical Training".
European Patent Office, The International Search Report and Written Opinion for International Application No. PCT/US2012/070971, mailed Mar. 18, 2013, entitled "Advanced Surgical Simulation".
Human Patient Simulator, Medical Education Technologies, Inc., http://www.meti.com (1999) all.
The International Bureau of WIPO, International Preliminary Report on Patentability for International Application No. PCT/US2011/053859, titled "Portable Laparoscopic Trainer" dated Apr. 2, 2013.
European Patent Office, The International Search Report and Written Opinion for International Application No. PCT/US2013/062363, mailed Jan. 22, 2014, entitled "Surgical Training Model for Laparoscopic Procedures".
European Patent Office, The International Search Report and Written Opinion for International Application No. PCT/US2013/061949, mailed Feb. 17, 2014, entitled "Surgical Training Model for Laparoscopic Procedures".
Anonymous: Realsim Systems—LTS2000, Sep. 4, 2005, pp. 1-2, XP055096193, Retrieved from the Internet: URL:https://web.archive.org/web/2005090403;3030/http://www.realsimsystems.com/exersizes.htm (retrieved on Jan. 14, 2014).
European Patent Office, The International Search Report and Written Opinion for International Application No. PCT/US2013/062269, mailed Feb. 17, 2014, entitled "Surgical Training Model for Transluminal Procedures".
European Patent Office, The International Search Report and Written Opinion for International Application No. PCT/US2013/061557, mailed Feb. 10, 2014, entitled "Surgical Training Model for Laparoscopic Procedures".
European Patent Office, The International Search Report and Written Opinion for International Application No. PCT/US2013/061728 mailed Oct. 18, 2013, entitled "Surgical Training Model for Laparoscopic Procedures".
Limps and Things, EP Guildford Mattu Hernia Trainer, http://limbsandthings.com/us/products/tep-guildford-mattu-hernia-trainer/.
Simulab, Hernia Model, http://www.simulab.com/product/surgery/open/hernia-model.
McGill Laparoscopic Inguinal Hernia Simulator, Novel Low-Cost Simulator for Laparoscopic Inguinal Hernia Repair.
University of Wisconsin—Madison Biomedical Engineering, Inguinal Hernia Model, http://bmedesign.engr.wisc.edu/projects/s10/hernia_model/.
The International Bureau of WIPO, International Preliminary Report on Patentability for International Application No. PCT/US2012/070971, titled "Advanced Surgical Simulation" dated Jun. 24, 2014.
The International Bureau of WIPO, International Preliminary Report on Patentability for International Application No. PCT/US2012/060997, titled "Simulated Tissue Structure for Surgical Training" dated Apr. 22, 2014.
European Patent Office, The International Search Report and Written Opinion for International Application No. PCT/US2014/019840 mailed Jul. 4, 2014 entitled "Advanced Surgical Simulation Constructions and Methods".
European Patent Office, The International Search Report and Written Opinion for International Application No. PCT/US2014/048027, titled "First Entry Model" mailed Oct. 17, 2014.
European Patent Office, The International Search Report and Written Opinion of the International Searching Authority for International Application No. PCT/US2014/038195 titled "Hernia Model", mailed Oct. 15, 2014.
European Patent Office, The International Search Report and Written Opinion for International Application No. PCT/US2014/042998, title; Gallbladder Model, mailed Jan. 7, 2015.
The International Bureau of WIPO, International Preliminary Report on Patentability, for PCT application No. PCT/US2013/053497, titled, Simulated Stapling and Energy Based Ligation for Surgical Training, mailed Feb. 12, 2015.
The International Bureau of WIPO, International Preliminary Report on Patentability for international application No. PCT/US2013/061728, titled Surgical Training Model for Laparoscopic Procedures, mailed Apr. 9, 2015.
The International Bureau of WIPO, International Preliminary Report on Patentability for International Application No. PCT/US2013/062363, titled Surgical Training Model for Laparoscopic Procedures, mailed Apr. 9, 2015.
The International Bureau of WIPO, International Preliminary Report on Patentability for International Application No. PCT/US2013/062269, titled Surgical Training Model for Laparoscopic Procedures, mailed Apr. 9, 2015.
The International Bureau of WIPO, International Preliminary Report on Patentability for International Application No. PCT/US2013/061557, titled Surgical Training Model for Laparoscopic Procedures, mailed Apr. 9, 2015.
The International Bureau of WIPO, International Preliminary Report on Patentability for International Application No. PCT/US2013/061949, titled Surgical Training Model for Laparoscopic Procedures, mailed Apr. 9, 2015.
European Patent Office, The International Search Report and Written Opinion for International Application No. PCT/US2015/020574, titled "Advanced First Entry Model for Surgical Simulation," mailed Jun. 1, 2015.
European Patent Office, The International Search Report and Written Opinion for International Application No. PCT/US2015/022774, mailed Jun. 11, 2015 entitled "Simulated Dissectible Tissue."
Kurashima Y et al, "A tool for training and evaluation of Laparoscopic inguinal hernia repair; the Global Operative Assessment of Laparoscopic Skills—Groin Hernia" American Journal of Surgery, Paul Hoeber, New York, NY, US vol. 201, No. 1, Jan. 1, 2011, pp. 54-61 XP027558745.
Lamouche, Guy, et al., "Review of tissue simulating phantoms with controllable optical, mechanical and structural properties for use in optical coherence tomography," Biomedical Optics Express, vol. 3, No. 6, Jun. 1, 2012 (18 pgs.).
Anonymous: Silicone Rubber—from Wikipedia, the free encyclopedia, Feb. 21, 2014, pp. 1-6.
European Patent Office, International Search Report and Written Opinion for International Application No. PCT/US2013/053497 titled "Simulated Stapling and Energy Based Ligation for Surgical Training" dated Nov. 5, 2013.
The International Bureau of WIPO, International Preliminary Report on Patentability for International Application No. PCT/US2014/019840, titled Simulated Tissue Structure for Surgical Training, mailed Sep. 11, 2015.
The International Bureau of WIPO, International Preliminary Report on Patentability for International Application No. PCT/US2014/038195, titled Hernia Model, mailed Nov. 26, 2015.
The International Bureau of WIPO, International Preliminary Report on Patentability for International Application No. PCT/US2014/042998, titled "Gallbladder Model" dated Dec. 30, 2015.
The International Bureau of WIPO, International Preliminary Report on Patentability for International Application No. PCT/US2014/048027, titled "First Entry Model" dated Feb. 4, 2016.
Society of Laparoendoscopic Surgeons, "Future Technology Session: The Edge of Innovation in Surgery, Space, and Business," http://www.laparoscopytoday.com/endourology/page/2/, Figure 1B:

(56) References Cited

OTHER PUBLICATIONS http://laparoscopy.blogs.com/laparoscopy_today/images/6-1/6-1 VlaovicPicB.jpg , Sep. 5-8, 2007, 10 pgs.
European Patent Office, International Search Report and Written Opinion for International Application No. PCT/US2015/059668, entitled "Simulated Tissue Models and Methods," dated Apr. 26, 2016, 20 pgs.
Australian Patent Office, Patent Examination Report No. 1 for Australian Application No. 2012358851, titled "Advanced Surgical Simulation," dated May 26, 2016, 3 pgs.
Miyazaki Enterprises, "Miya Model Pelvic Surgery Training Model and Video," www.miyazakienterprises, printed Jul. 1, 2016, 1 pg.
European Patent Office, International Search Report and Written Opinion for International Application No. PCT/US2016/032292, entitled "Synthetic Tissue Structures for Electrosurgical Training and Simulation," dated Jul. 14, 2016, 11 pgs.
European Patent Office, International Search Report and Written Opinion for International Application No. PCT/US2016/018697, entitled "Simulated Tissue Structures and Methods," dated Jul. 14, 2016, 21 pgs.
European Patent Office, International Search Report and Written Opinion for International Application No. PCT/US2016/034591, entitled "Surgical Training Model for Laparoscopic Procedures," dated Aug. 8, 2016, 18 pgs.
European Patent Office, The International Search Report and Written Opinion of the International Searching Authority for International Application No. PCT/US2016/036664, entitled "Hysterectomy Model", mailed Aug. 19, 2016, 15 pgs.
The International Bureau of WIPO, International Preliminary Report on Patentability for International Application No. PCT/US2015/020574, entitled "Advanced First Entry Model for Surgical Simulation," dated Sep. 22, 2016, 9 pgs.
European Patent Office, The International Search Report and Written Opinion of the International Searching Authority for International Application No. PCT/US2016/0043277 titled "Appendectomy Model", mailed Oct. 4, 2016, 12 pgs.
The International Bureau of WIPO, International Preliminary Report on Patentability for International Application No. PCT/US2015/022774, titled "Simulated Dissectible Tissue," dated Oct. 6, 2016, 9 pgs.
European Patent Office, The International Search Report and Written Opinion of the International Searching Authority for International Application No. PCT/US2016/041852 titled "Simulated Dissectible Tissue", mailed Oct. 13, 2016, 12 pgs.
European Patent Office, Invitation to Pay Additional Fees for International Application No. PCT/US2016/062669, titled "Simulated Dissectible Tissue", mailed Feb. 10, 2017, 8 pgs.
European Patent Office, The International Search Report and Written Opinion of the International Searching Authority for International Application No. PCT/US2016/055148 titled "Hysterectomy Model", mailed Feb. 28, 2017, 12 pgs.
European Patent Office, The International Search Report and Written Opinion of the International Searching Authority for International Application No. PCT/US2016/062669 titled "Simulated Dissectible Tissue", mailed Apr. 5, 2017, 19 pgs.
European Patent Office, Examination Report for European Application No. 14733949.3 titled "Gallbladder Model," mailed Dec. 21, 2016, 6 pgs.
European Patent Office, The International Search Report and Written Opinion of the International Searching Authority for International Application No. PCT/US2017/020389 titled "Simulated Tissue Cartridge", mailed May 24, 2017, 13 pgs.
The International Bureau of WIPO, International Preliminary Report on Patentability for International Application No. PCT/US2015/059668, entitled "Simulated Tissue Models and Methods," dated May 26, 2017, 16 pgs.
European Patent Office, The International Search Report and Written Opinion for International Application No. PCT/US2017/039113, entitled "Simulated Abdominal Wall," mailed Aug. 7, 2017, 13 pgs.
The International Bureau of WIPO, International Preliminary Report on Patentability for International Application No. PCT/US2016/018697, entitled "Simulated Tissue Structures and Methods," dated Aug. 31, 2017, 14 pgs.
The International Bureau of WIPO, International Preliminary Report on Patentability for International Application No. PCT/US2016/0032292, entitled "Synthetic Tissue Structures for Electrosurgical Training and Simulation," dated Nov. 23, 2017, 8 pgs.
The International Bureau of WIPO, International Preliminary Report on Patentability for International Application No. PCT/US2016/034591, entitled "Surgical Training Model for Laparoscopic Procedures," dated Dec. 7, 2017, 14 pgs.
The International Bureau of WIPO, International Preliminary Report on Patentability for International Application No. PCT/US2016/036664, entitled "Hysterectomy Model," dated Dec. 21, 2017, 10 pgs.
The International Bureau of WIPO, International Preliminary Report on Patentability for International Application No. PCT/US2016/041852, entitled "Simulated Dissectible Tissue," dated Jan. 25, 2018, 12 pgs.
European Patent Office, Extended European Search Report for European Patent Application No. EP 17202365.7, titled "Gallbladder Model", dated Jan. 31, 2018, 8 pgs.
The International Bureau of WIPO, International Preliminary Report on Patentability for International Application No. PCT/US2016/043277, entitled "Appendectomy Model," dated Feb. 1, 2018, 9 pgs.
The International Bureau of WIPO, International Preliminary Report on Patentability for International Application No. PCT/US2016/055148, entitled "Hysterectomy Model," dated Apr. 12, 2018, 12 pgs.
European Patent Office, The International Search Report and Written Opinion for International Application No. PCT/US2018/018895, entitled "Synthetic Tissue Structures for Electrosurgical Training and Simulation," mailed May 17, 2018, 12 pgs.
The International Bureau of WIPO, International Preliminary Report on Patentability for International Application No. PCT/US2016/062669, entitled "Simulated Dissectible Tissue," dated May 31, 2018, 11 pgs.
European Patent Office, The International Search Report and Written Opinion for International Application No. PCT/US2018/018036, entitled "Laparoscopic Training System," mailed Jun. 8, 2018, 13 pgs.
3D-MED Corporation, "Validated Training Course for Laparoscopic Skills", https://www.3-dmed.com/sites/default/files/product-additional/product-spec/Validated%20Training%20Course%20for%20Laparoscopic%20Skills.docx_3.pdf , printed Aug. 23, 2016, pp. 1-6.
3D-MED Corporation, "Loops and Wire #1," https://www.3-dmed.com/product/loops-and-wire-1 , printed Aug. 23, 2016, 4 pgs.
Barrier, et al., "A Novel and Inexpensive Vaginal Hysterectomy Simulatory," Simulation in Healthcare: The Journal of the Society for Simulation in Healthcare, vol. 7, No. 6, Dec. 1, 2012, pp. 374-379.
European Patent Office, Extended European Search Report for European Patent Application No. EP 18177751.7, titled "Portable Laparoscopic Trainer", dated Jul. 13, 2018, 8 pgs.
European Patent Office, The International Search Report and Written Opinion for International Application No. PCT/US2018/034705, entitled "Laparoscopic Training System," mailed Aug. 20, 2018, 14 pgs.
The International Bureau of WIPO, International Preliminary Report on Patentability for International Application No. PCT/US2017/020389, entitled "Simulated Tissue Cartridge," dated Sep. 13, 2018, 8 pgs.
European Patent Office, Extended European Search Report for European Patent Application No. EP 18184147.9, titled "First Entry Model," dated Nov. 7, 2018, 7 pgs.
The International Bureau of WIPO, International Preliminary Report on Patentability for International Application No. PCT/US2017/039113, entitled "Simulated Abdominal Wall," dated Jan. 10, 2019, 8 pgs.

(56) References Cited

OTHER PUBLICATIONS

European Patent Office, Extended European Search Report for European Patent Application No. EP 18210006.5, titled "Surgical Training Model for Laparoscopic Procedures," dated Jan. 21, 2019, 7 pgs.
European Patent Office, Extended European Search Report for European Patent Application No. EP 18207214.0, titled "Synthetic Tissue Structures for Electrosurgical Training and Simulation," dated Mar. 28, 2019, 6 pgs.
European Patent Office, Extended European Search Report for European Patent Application No. EP 18216002.8, titled "Surgical Training Model for Laparoscopic Procedures," dated Apr. 2, 2019, 6 pgs.
European Patent Office, Extended European Search Report for European Patent Application No. EP 18216005.1, titled "Surgical Training Model for Laparoscopic Procedures," dated Apr. 2, 2019, 7 pgs.
European Patent Office, Extended European Search Report for European Patent Application No. EP 19159065.2, titled "Simulated Tissue Structures and Methods," dated May 29, 2019, 8 pgs.
The International Bureau of WIPO, International Preliminary Report on Patentability for International Application No. PCT/US2018/018036, entitled "Laparoscopic Training System," dated Aug. 29, 2019, 8 pgs.
The International Bureau of WIPO, International Preliminary Report on Patentability for International Application No. PCT/US2018/018895, entitled "Synthetic Tissue Structures for Electrosurgical Training and Simulation," dated Sep. 6, 2019, 7 pgs.
European Patent Office, Extended European Search Report for European Patent Application No. EP 20153338.7, titled "Advanced Surgical Simulation Constructions and Methods," dated Mar. 5, 2020, 7 pgs.
European Patent Office, Extended European Search Report for European Patent Application No. EP 19215545.5, titled "Advanced First Entry Model for Surgical Simulation," dated Mar. 26, 2020, 8 pgs.
"Surgical Female Pelvic Trainer (SFPT) with Advanced Surgical Uterus," Limbs & Things Limited, Issue 1, Jul. 31, 2003, URL:https://www.accuratesolutions.it/wp-content/uploads/2012/08/ Surgical_Female_Pelvic_Trainer_SFPT_with_Advanced_Uterus_User_Guide.pdf, retrieved Feb. 21, 2020, 2 pgs.
European Patent Office, Extended European Search Report for European Patent Application No. EP 20158500.7, titled "Surgical Training Device," dated May 14, 2020, 9 pgs.
European Patent Office, Extended European Search Report for European Patent Application No. EP 20186713.2, titled "Simulated Dissectible Tissue," dated Nov. 10, 2020, 12 pgs.
European Patent Office, Extended European Search Report for European Patent Application No. 21159294.4, titled "Surgical Training Model for Laparoscopic Procedures," dated Apr. 5, 2021, 7 pgs.
Condino et al.; "How to build patient-specific synthetic abdominal anatomies. An innovative approach from physical toward hybrid surgical simulators," The International Journal of Medical Robotics and Computer Assisted Surgery, Apr. 27, 2011, vol. 7, No. 2, pp. 202-213.
Wilkes et al.; "Closed Incision Management with Negative Pressure Wound Therapy (CIM): Biomechanics," Surgical Innovation 19(1), URL:https://journals.sagepub.com/doi/pdf/10.1177/1553350611414920, Jan. 1, 2012, pp. 67-75.
European Patent Office, Extended European Search Report for European Patent Application No. EP 21182654.0, titled "Simulated Dissectible Tissue," dated Oct. 22, 2021, 13 pgs.
European Patent Office, Extended European Search Report for European Patent Application No. EP 21191452.8, titled "Advanced Surgical Simulation Constructions and Methods," dated Dec. 13, 2021, 8 pgs.
European Patent Office, Extended European Search Report for European Patent Application No. EP 22151452.4, titled "Portable Laparoscopic Trainer," dated Apr. 13, 2022, 8 pgs.
European Patent Office, Extended European Search Report for European Patent Application No. EP 22172093.1, titled "Hysterectomy Model," dated Jul. 20, 2022, 9 pgs.
European Patent Office, Extended European Search Report for European Patent Application No. 22212824.1, titled "Surgical Training Model for Laparoscopic Procedures," dated Feb. 28, 2023, 20 pgs.
European Patent Office, Extended European Search Report for European Patent Application No. 22214865.2, titled "Gallbladder Model," dated Feb. 28, 2023, 18 pgs.
European Patent Office, Partial Extended European Search Report for European Patent Application No. 23180886.6, titled "Simulated Dissectible Tissue," dated Sep. 20, 2023, 16 pgs.
European Patent Office, Extended European Search Report for European Patent Application No. 23200455.6, titled "Simulated Training Model for Laparoscopic Procedures," dated Dec. 4, 2023, 7 pgs.
European Patent Office, Extended European Search Report for European Patent Application No. 23186659.1, titled "Hysterectomy Model," dated Mar. 5, 2024, 11 pgs.

* cited by examiner

*Fig. 15*
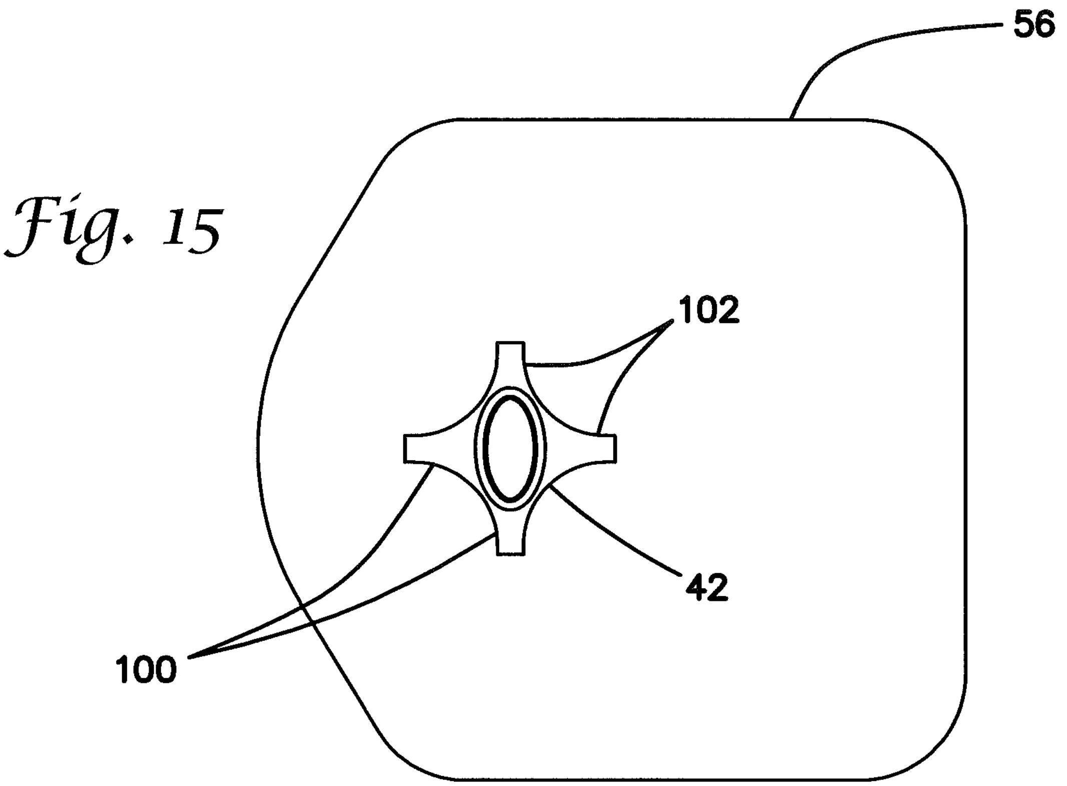
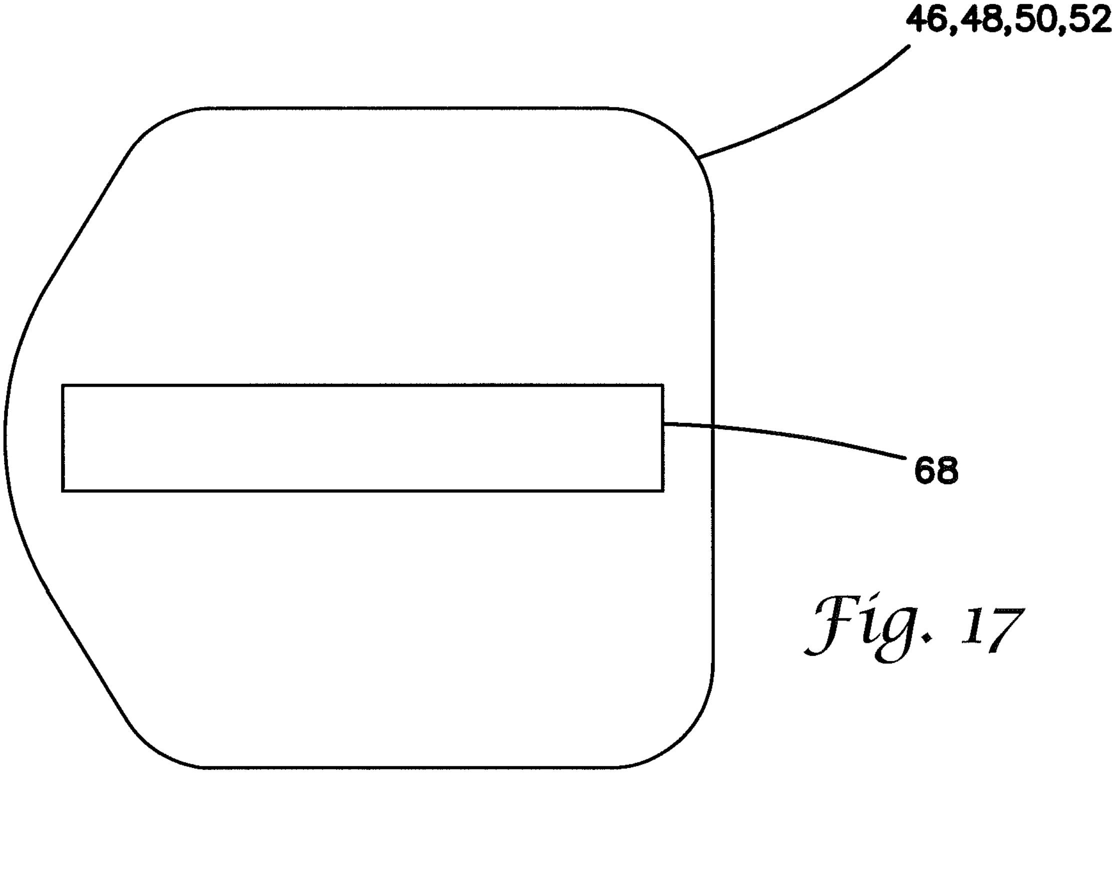
*Fig. 17*

FIRST ENTRY MODEL

CROSS-REFERENCE TO RELATED APPLICATIONS

This application is a continuation of U.S. patent application Ser. No. 16/878,291 filed on May 19, 2020 entitled "First entry model" which is a continuation of U.S. patent application Ser. No. 16/030,696 filed on Jul. 9, 2018 entitled "First entry model" now U.S. Pat. No. 10,657,845 issued May 19, 2020 which is a continuation of U.S. patent application Ser. No. 15/370,231 filed on Dec. 6, 2016 entitled "First entry model" now U.S. Pat. No. 10,026,337 issued Jul. 17, 2018 which is a continuation of U.S. patent application Ser. No. 14/340,234 filed on Jul. 24, 2014 entitled "First entry model" now U.S. Pat. No. 9,548,002 issued on Jan. 17, 2017 which claims priority to and benefit of U.S. Provisional Patent Application Ser. No. 61/857,982 filed on Jul. 24, 2013 entitled "First entry model" and U.S. Provisional Patent Application Ser. No. 61/971,714 filed on Mar. 28, 2014 entitled "First entry model" which are incorporated herein by reference in their entireties.

FIELD OF THE INVENTION

This application relates to surgical training tools, and in particular, to simulated tissue structures and models for teaching and practicing surgical procedures.

BACKGROUND OF THE INVENTION

Laparoscopic surgery requires several small incisions in the abdomen for the insertion of trocars or small cylindrical tubes approximately 5 to 10 millimeters in diameter through which surgical instruments and a laparoscope are placed into the abdominal cavity. The laparoscope illuminates the surgical field and sends a magnified image from inside the body to a video monitor giving the surgeon a close-up view of the organs and tissues. The surgeon watches the live video feed and performs the operation by manipulating the surgical instruments placed through the trocars.

The first step in laparoscopic surgery is to make a small incision to access and create pneumoperitoneum. Pneumoperitoneum is the insufflation of the abdominal cavity with carbon dioxide gas. Insufflation with gas creates a working space in the abdomen necessary for laparoscopy. Once a proper working space has been created, surgical instruments can be inserted for performing a laparoscopic procedure. This process of penetrating the abdomen and creating pneumoperitoneum prior to insertion of other instruments is called first entry. There are many different ways to achieve pneumoperitoneum. One option is using a Veress needle. A Veress needle is approximately 12-15 centimeters long with a diameter of approximately 2 millimeters. The surgeon inserts the spring-loaded needle into the abdomen of the patient after making a small incision. When the needle breaches the inner abdominal space, the spring-loaded inner stylet springs forward to cover the sharp needle in order protect internal organs. The surgeon relies on the tactile feedback of the needle and spring for proper placement. Once proper entry is confirmed, carbon dioxide is introduced through the Veress needle and into the abdominal cavity of the patient expanding the abdomen to creating a working space.

Another option is a Hasson technique or cut down technique in which the surgeon makes an initial incision at the umbilicus and the tissue is bluntly dissected. A suture is placed on either side of the incision into the fascia layer to help hold the device in place. The supraperitoneal tissue is dissected away and the peritoneum is incised to enter the abdominal cavity. At this point, a Hasson trocar is inserted into the incision. The Hasson trocar has a blunt tip with suture ties and/or a balloon to hold it in place. After the trocar is placed into the incision, the device is secured with sutures and/or the balloon and carbon dioxide gas is pumped into the patient through the trocar to achieve pneumoperitoneum.

Another option is direct trocar entry. In this option, the surgeon uses a bladed or non-bladed trocar either optically or non-optically. The trocar is placed through the layers of the abdominal wall after the initial skin incision is made. When used optically, a camera is inserted into the trocar before entry. After the initial incision is made, the trocar is placed through the layers of the abdomen. Since the camera is present, all of the layers of the abdominal wall can be observed during penetration. Once the surgeon sees that he or she has broken through the peritoneum, penetration can halt, the obturator tip of the trocar pulled back slightly or removed entirely and insufflation can commence by pumping carbon dioxide gas in through the cannula to create pneumoperitoneum.

Another option involves a specialized first entry trocar such as the FIOS® first entry trocar made by Applied Medical Resources Corporation in California. Like optical direct trocar entry, a camera is inserted into the FIOS® trocar and the abdominal wall layers are observed during insertion into the abdominal cavity. The specialized FIOS® trocar has a small vent hole in the tip such that instead of requiring that the obturator of the trocar be pulled back or removed completely to introduce carbon dioxide through the cannula, carbon dioxide gas is introduced through the small vent hole in the tip of the obturator with the camera in place. Because carbon dioxide can be introduced through the tip, the FIOS® trocar does not have to penetrate as deeply into the abdominal cavity as a traditional trocar, thereby, affording internal organs greater protection before insufflation can commence. Also, because the obturator does not have to be pulled back or removed, observation via the inserted camera can take place at the point of insufflation.

In addition to the above options for entering the abdominal cavity, generally, there are two common places on the abdomen that a surgeon must know how to enter. The most widely used location for first entry is the umbilicus. The umbilicus is a natural weakening in the abdomen where the umbilical cord was attached in the womb. In this part of the abdomen, there are no rectus muscles, arteries or veins so it is generally easier to reach the abdominal cavity. Additionally, the umbilicus is typically an easy place to hide a scar. When surgeons use the umbilicus as an entry site, particularly for the Hasson technique, clamps are often used to grab the base of the umbilicus and the umbilicus is inverted. At this point, an incision is made and the surgeon cuts down as desired and inserts the trocar or Veress needle. With optical entry, the surgeon is able to see all the layers of the abdominal wall. In this location of penetration, they are able to see the fatty tissue, linea alba, *transversalis* fascia and, finally, the peritoneum. Additionally, when entering at the umbilicus, the umbilical stalk should also be visible. The stalk is what remains of the umbilical cord and it stretches from the skin making up the umbilicus to the peritoneal layer.

If a patient has had a previous surgery and adhesions are suspected or a hernia is present at the site of the umbilicus, first entry may need to occur at another location. In this case, the surgeon will often enter from the left upper quadrant since there is less chance of damaging a vital organ in this location. The left upper quadrant is different from the umbilicus region in that there are muscle layers. The rectus abdominus muscles run parallel with the patient's abdomen and are found on either side of the patient's midline. Underneath the rectus abdominus muscles run the inferior epigastric veins and arteries which the surgeon must be careful to avoid. When a surgeon is entering the upper quadrant of the abdominal cavity optically, he or she is able to see the skin, fatty tissue, anterior rectus sheath, rectus abdominus, the epigastric vein, which runs through the posterior rectus sheath, and finally, the peritoneum. If the left upper quadrant is not an ideal position for a port, the surgeon may choose to enter at another location such as sub-xiphoid where subcutaneous fat, rectus sheath and peritoneum are present.

Since there are many options for first entry, it is important that surgeons have a way to learn and practice the various techniques. There is a need for an anatomical model of the umbilical region and surrounding abdomen that is anatomically correct and includes all the layers of the abdominal wall as well as the veins and arteries that run through the wall. Not only does the model have to be anatomically correct, but also, the model must provide a realistic aural and tactile sensation. For example, when using a Veress needle, two pops are generally felt as the surgeon pushes the needle through the abdominal wall. For optical entry, the surgeon needs to view all of the appropriate tissue layers in the abdominal wall. For entry through the umbilicus, the surgeon must be able to grasp and invert the umbilicus. Also, the model must be able to be used with all four first entry techniques and at multiple (umbilical and upper left quadrant at minimum) entry sites.

SUMMARY OF THE INVENTION

According to one aspect of the invention, a simulated tissue structure is provided. The simulated tissue structure includes a support and an artificial anatomical portion. The artificial anatomical portion is configured to simulate a region of an abdominal wall. The anatomical portion is connected to the support such that the anatomical portion is penetrable from a first side to a second side of the anatomical portion. The anatomical portion includes a plurality of simulated tissue layers arranged in juxtaposition with each other. The simulated tissue layers include a simulated skin layer located above the remaining layers. Each of the remaining layers has an opening extending through the layer. The simulated skin layer has a top surface and a bottom surface. The top surface of the simulated skin layer defines a first side of the anatomical portion. The anatomical portion includes a tubular structure having a proximal end and a distal opening at a distal end. The distal end of the tubular extends through one or more of the openings in the remaining layers. In one variation, the proximal end of the tubular structure is connected to the simulated skin layer. The anatomical portion further includes a simulated peritoneum layer having a top surface and a bottom surface. The bottom surface of the simulated peritoneum layer forms the second side of the anatomical portion. The anatomical portion further includes a first layer having a top surface and a bottom surface. The bottom surface of the first layer overlays the top surface of the simulated peritoneum layer. The anatomical portion includes a second layer having a top surface and a bottom surface and the bottom surface of the second layer overlays the top surface of the first layer. The anatomical portion further includes a third layer having a top surface and a bottom surface. The bottom surface of the skin layer overlays the top surface of the third layer. The first layer is made of closed cell polyethylene foam. The second layer is made of fibrous material. The third layer is made of memory polyurethane foam.

According to another aspect of the invention, a surgical simulation system is provided. The system includes an abdominal wall model. The model includes a support and an artificial anatomical portion. The artificial anatomical portion is configured to simulate a region of an abdominal wall. The anatomical portion is connected to the support such that the anatomical portion is penetrable from a first side to a second side of the anatomical portion. The anatomical portion includes a plurality of simulated tissue layers arranged in juxtaposition with each other. The simulated tissue layers including a simulated skin layer located above the remaining layers. The simulated skin layer has a top surface and a bottom surface. The top surface of the simulated skin layer defines a first side of the anatomical portion. The surgical simulation system includes a trainer. The trainer includes a base and a top cover having a top surface and a bottom surface. The top cover is connected to and spaced apart from the base to define an internal cavity between the top cover and the base. The top cover has a first opening and the abdominal wall model is removably located inside the first opening. The model is connected to the top cover such that penetration of the anatomical portion provides access to the internal cavity of the trainer.

According to another aspect of the invention, a simulated tissue structure configured to simulate an abdominal wall is provided. The simulated abdominal wall structure includes a simulated skin layer having a top surface and a bottom surface. The simulated abdominal wall structure includes a simulated fat layer having a top surface and a bottom surface. The bottom surface of the simulated skin layer overlays the top surface of the simulated fat layer. A first simulated muscle layer having a top surface and a bottom surface is included. A second simulated muscle layer having a top surface and a bottom surface is included. The simulated abdominal wall structure further includes a third layer having a top surface and a bottom surface. The third layer is located between the first and second simulated muscle layers. A fourth layer having a top surface and a bottom surface is provided. A fifth layer having a top surface and a bottom surface is also included. The bottom surface of the fourth layer overlays the top surface of the fifth layer. The simulated abdominal wall structure includes a simulated peritoneum layer having a top surface and a bottom surface. The bottom surface of the fifth layer overlays the top surface of the simulated peritoneum layer. The fourth layer is made of fabric. The simulated fat layer is made of polyurethane memory foam. The simulated skin layer is made of silicone. The third and fifth layers are made of closed cell polyethylene foam.

According to another aspect of the invention, a simulated tissue structure is provided. The simulated tissue structure includes a support and an artificial anatomical portion. The support includes a top frame defining a top opening and a bottom frame defining a bottom opening. The artificial anatomical portion is configured to simulate a region of an abdominal wall. The artificial anatomical portion is connected to the support between the top frame and the bottom frame such that the anatomical portion is penetrable through the top opening and bottom opening. The anatomical portion includes a first layer having a top surface and a bottom surface and a second layer having a top surface and a bottom surface. The second layer has a second opening and the bottom surface of the first layer overlays the top surface of the second layer. The anatomical portion includes third layer having a top surface and a bottom surface. The third layer has a third opening or gap and the bottom surface of the second layer overlays the top surface of the third layer. A fourth layer having a top surface and a bottom surface is provided. The fourth layer has a fourth opening or gap and the bottom surface of the third layer overlays the top surface of the fourth layer. A fifth layer having a top surface and a bottom surface is provided. The fifth layer has a fifth opening or gap and the bottom surface of the fourth layer overlays the top surface of the fifth layer. A sixth layer having a top surface and a bottom surface is provided. The sixth layer has a sixth opening or gap and the bottom surface of the fifth layer overlays the top surface of the sixth layer. A seventh layer having a top surface and a bottom surface is provided. The seventh layer has a seventh opening and the bottom surface of the sixth layer overlays the top surface of the seventh layer. An eighth layer having a top surface and a bottom surface is provided. The eighth layer has an eighth opening and the eighth layer is located under the seventh layer. A ninth layer having a top surface and a bottom surface is provided. The ninth layer has a ninth opening and the bottom surface of the eighth layer overlays the top surface of the ninth layer. The third opening/gap, fourth opening/gap, fifth opening/gap and sixth opening/gap are elongate substantially in alignment with each other when the layers are overlayed and have a width and length that extends along a longitudinal axis. The second opening, seventh opening, eighth opening and ninth opening are substantially in alignment with each other and smaller than the elongate openings/gaps of the third opening/gap, fourth opening/gap, fifth opening/gap and sixth opening/gap. All of the openings/gaps overlap at least in part to provide passage of a simulated umbilicus.

According to another aspect of the invention, a method for manufacturing a simulated skin layer for a simulated abdominal wall is provided. A mold is provided. The mold includes a cavity having a first depth and a first well inside the cavity having a second depth greater than the first depth. A core is located inside the first well. A silicone mixture is poured into the mold cavity and first well. The silicone is cured inside the mold to form an artificial skin layer having a top surface and a bottom surface and a tubular structure extending from the top surface. The tubular structure is formed with a lumen that defines an opening in the layer at the proximal end and an opening at a distal end. The tubular structure is inverted by passing the distal end of the tubular structure through the opening. A thicker portion is formed around the first well. The opening at the proximal end of the tubular structure is sealed closed with adhesive to simulate an umbilicus.

According to one aspect of the invention, a model that allows users to practice first entry surgical procedures is provided. The first entry model includes an anatomical portion connected to a support. The anatomical portion includes a plurality of anatomical layers that is captured between two frame elements which can attach to a laparoscopic trainer.

BRIEF DESCRIPTION OF THE DRAWINGS

FIG. 15 is a bottom planar view of a *transversalis* fascia layer and umbilical stalk according to the present invention.

FIG. 17 is a top planar view that is representative of more than one layer in an anatomical portion of a first entry model according to the present invention.

DETAILED DESCRIPTION OF THE INVENTION

Figure 1:
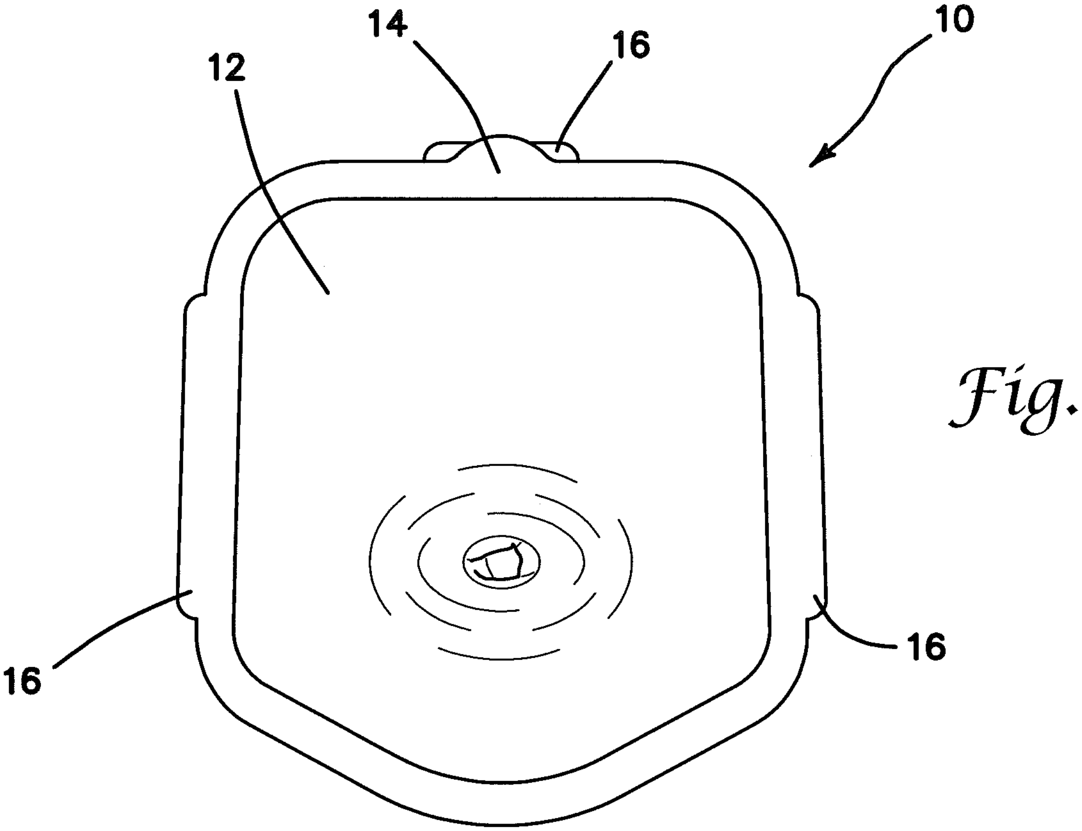
FIG. 1 is a top perspective view of a first entry model according to the present invention.
Figure 2:
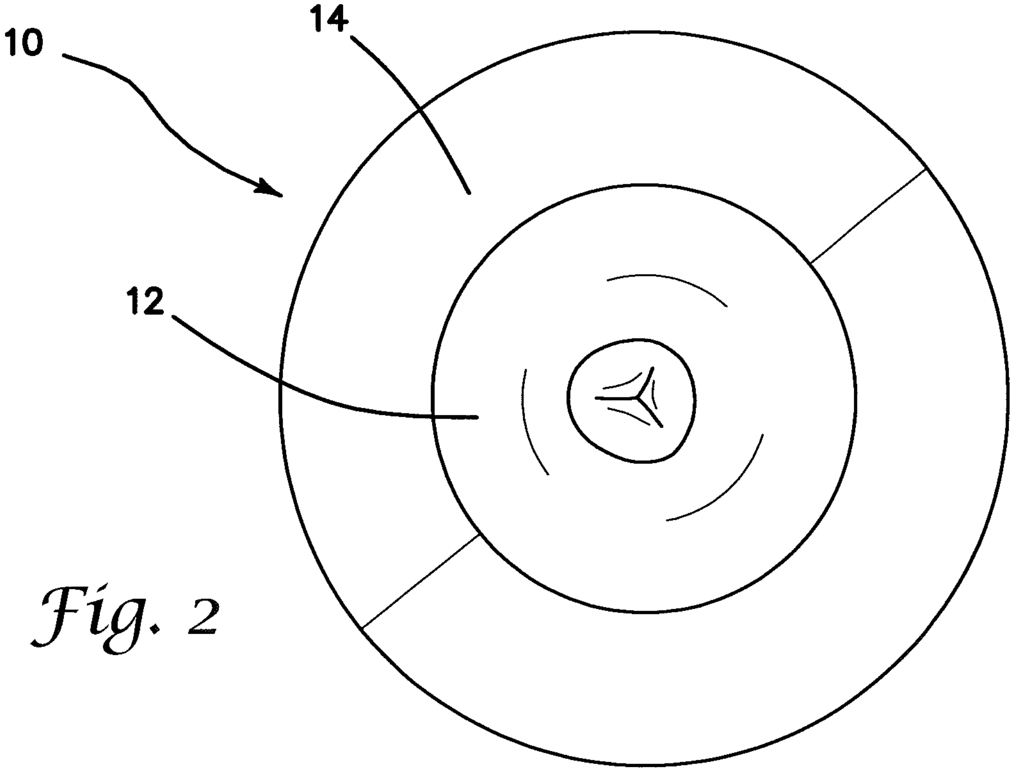
FIG. 2 is top perspective view of a first entry model according to the present invention.

Turning now to FIG. 1, there is shown a model 10 of an abdominal region that includes the umbilicus for practicing surgical first entry into the abdominal cavity for performing laparoscopic surgical procedures. Throughout this specification the model 10 will be referred to as the first entry model 10. The model 10 includes an anatomical portion 12 connected to a support 14 to form a substantially planar configuration. The support 14 is a frame that encompasses and connects to the perimeter of the anatomical portion 12 and holds the anatomical portion 12 together. In particular, the support 14 includes a top frame and a bottom frame made of plastic material sufficiently rigid to provide structural support and maintain the planar shape of the model 10 and permit the center-located anatomical portion to be penetrated from one side to the other. In one variation, the model 10 is slightly curved to mimic an outwardly curved abdomen. The top frame and the bottom frame connect together capturing the perimeter of the anatomical portion 12 between the top and bottom frames. The model 10 in FIG. 1 is polygonal having five sides forming a slightly elongated shape wherein one side is curved outwardly in a generally U-shaped configuration. A model 10 having a circular support 14 that frames a circular anatomical portion 12 is shown in FIG. 2. The model 10 can be any shape. The frame 14 includes connecting elements 16 configured for connecting the model 10 to a larger laparoscopic trainer 20 as shown in FIG. 3.

Figure 3:
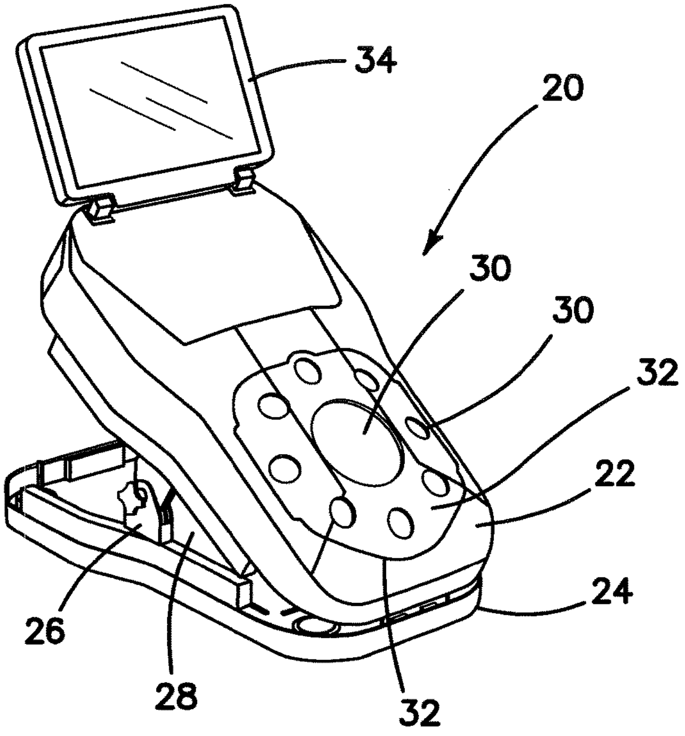
FIG. 3 is a top perspective view of a laparoscopic trainer for use with a first entry model according to the present invention.

Turning now to FIG. 3, a laparoscopic trainer 20 includes a top cover 22 connected to a base 24 by a pair of legs 26 spacing the top cover 22 from the base 24. The laparoscopic trainer 20 is configured to mimic the torso of a patient such as the abdominal region. The top cover 22 is representative of the anterior surface of the patient and a space 28 defined between the top cover 22 and the base 24 is representative of an interior of the patient or body cavity where organs reside. The laparoscopic trainer 20 is a useful tool for teaching, practicing and demonstrating various surgical procedures and their related instruments in simulation of a patient. When assembled, the top cover 22 is positioned directly above the base 24 with the legs 26 located substantially at the periphery and interconnected between the top cover 22 and base 24 The top cover 22 and base 24 are substantially the same shape and size and have substantially the same peripheral outline. The laparoscopic trainer 20 includes a top cover 22 that angulates with respect to the base 24. The legs 26 are configured to permit the angle of the top cover 22 with respect to the base 24 to be adjusted. FIG. 3 illustrates the trainer 20 adjusted to an angulation of approximately 30-45 degrees with respect to the base 24. A laparoscopic trainer 20 is described in co-pending U.S. patent application Ser. No. 13/248,449 entitled "Portable laparoscopic trainer" and filed on Sep. 29, 2011 by Pravong et al. to Applied Medical Resources Corporation and published as U.S. Patent Application Publication No. 2012/0082970, hereby incorporated by reference in its entirety herein.

For practicing various surgical techniques, surgical instruments are inserted into the cavity 28 of the laparoscopic trainer 20 through pre-established apertures 30 in the top cover 22. These pre-established apertures 30 may include seals that simulate trocars or may include simulated tissue that simulates the patient's skin and abdominal wall portions. For example, the circular first entry model 10 depicted in FIG. 2 is connected to the top cover 22 in the location of the central circular aperture 30 that has a conforming circular shape. The top cover 22 of the laparoscopic trainer 20 is configured with a removable insert 32 that is replaceable with the first entry model 10 depicted in FIG. 1. The insert 32, which is provided with apertures 30, has a shape that conforms to an opening in the top cover 22. When the insert 32 is removed, the first entry model 10, such as the one depicted in FIG. 1, having a conforming shape is inserted into the opening in the top cover 20 and the connecting elements 16 on the first entry model 10 aid in securing the model 10 to the trainer 20.

Various tools and techniques may be used to penetrate the top cover 20 as described in the background of this description to perform mock procedures not only on the model 10 but also on additional model organs placed between the top cover 22 and the base 24. When placed inside the cavity 28 of the trainer 20, an organ model is generally obscured from the perspective of the user who can then practice performing surgical techniques laparoscopically by viewing the surgical site indirectly via a video feed displayed on a video monitor 34. The video display monitor 34 is hinged to the top cover 22 and is shown in an open orientation in FIG. 3. The video monitor 34 is connectable to a variety of visual systems for delivering an image to the monitor 34. For example, a laparoscope inserted through one of the pre-established apertures 30 or a webcam located in the cavity 28 and used to observe the simulated procedure can be connected to the video monitor 34 and/or a mobile computing device to provide an image to the user. After first entry procedures are practiced on a first entry model 10 connected to the trainer 20, the first entry model 10 is removed and may be replaced with a new insert or reconstructed and reconnected to the trainer 20 to allow training to continue or be repeated. Of course, the first entry model 10 may be employed independently of the trainer 20 for practicing first entry techniques.

Figure 4:
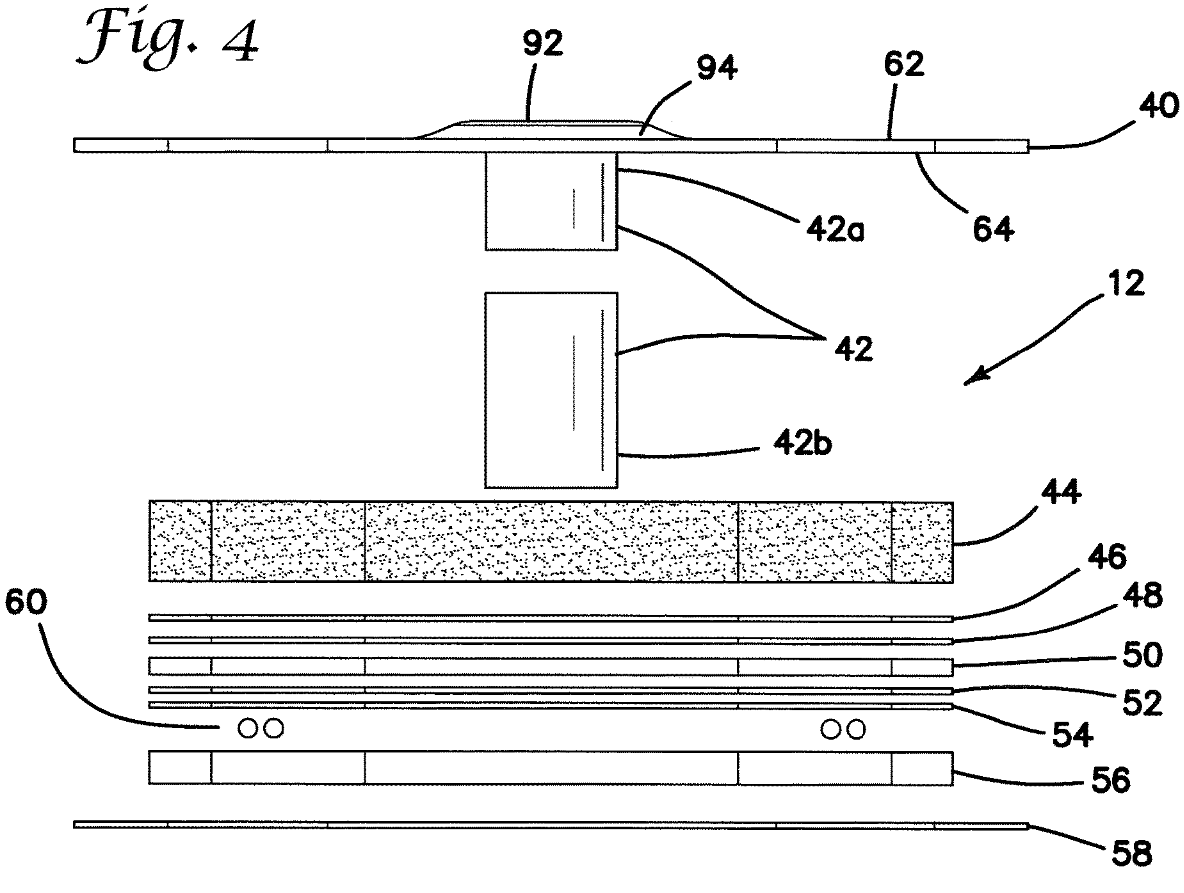
FIG. 4 is a side, exploded view of an anatomical portion of a first entry model according to the present invention.
Figure 5:
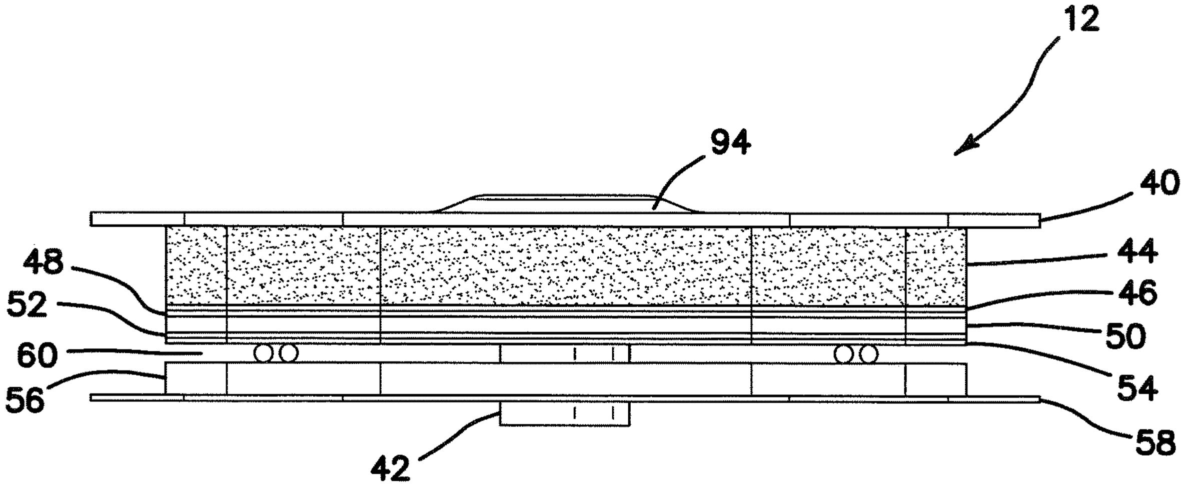
FIG. 5 is a side view of an anatomical portion of a first entry model according to the present invention.
Figure 6:
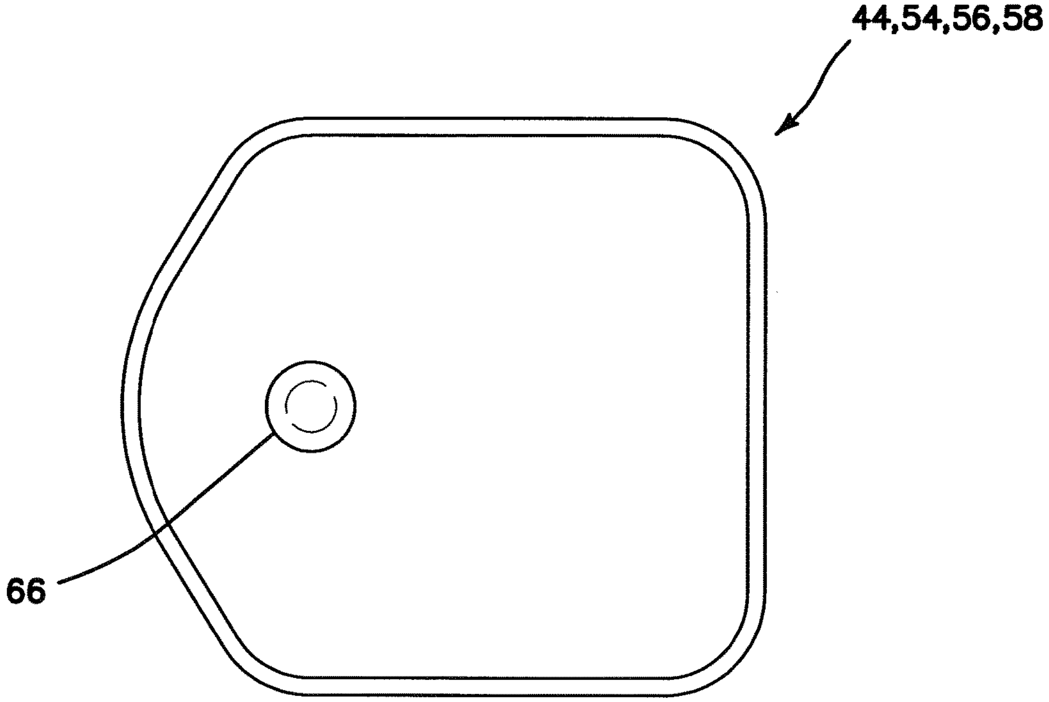
FIG. 6 is a top planar view that is representative of more than one layer in an anatomical portion of a first entry model according to the present invention.

Turning now to FIGS. 4 and 5, the anatomical portion 12 of the first entry model 10 made of artificial material will now be described. The anatomical portion 12 includes a skin layer 40, an umbilical stalk 42, a fat layer 44, an anterior rectus sheath layer 46, a first rectus muscle layer 48, a second rectus muscle layer 50, a third rectus muscle layer 52, a posterior rectus sheath layer 54, a *transversalis* fascia layer 56, and a peritoneum layer 58. The layers 40, 44, 46, 48, 50, 52, 54, 56, 58 are placed one on top of the other as shown in FIGS. 5-6 with the umbilical stalk 42 penetrating through all of the layers beneath the skin layer 40. The layers 40, 44, 46, 48, 50, 52, 54, 56, 58 are connected together with adhesive or other fastener. In one variation, the layers 40, 44, 46, 48, 50, 52, 54, 56 are connected with at least one price-tag holder punched through the layers and sandwiched between the skin layer 40 and the peritoneum layer 58 before being attached to the frame 14. In another variation, the layers are held together without adhesive or other fastener and are clamped between the top frame and bottom frame. An optional inferior epigastric vein and artery layer 60 is included between the posterior rectus sheath layer 54 and the *transversalis* fascia layer 56 as shown in FIGS. 4-5.

With continued reference to FIG. 4, the skin layer 40 is molded of silicone or thermoplastic elastomer dyed with a flesh color. The skin layer 40 includes a top surface 62 and bottom surface 64 defining a thickness of approximately 0.1 inches. The skin layer 40 includes an integrally formed umbilical stalk portion 42*a*. The skin layer 40 will be described in greater detail below.

Still referencing FIG. 4, the fat layer 44 is made of cellular polyethylene foam having a yellow color. The cellular foam layer is not solid but textured with air bubbles. The fat layer 44 is approximately 0.625 inches thick. The anterior rectus sheath layer 46 is made of solid ethylene vinyl acetate (EVA) foam having a white color and is approximately 1 millimeter thick. The first rectus muscle layer 48 is made of solid EVA foam and is red in color and approximately 1 millimeter thick. The second rectus muscle layer 50 is made of cellular polyethylene foam having a pink color. The second rectus muscle layer 50 is cellular foam that includes air bubbles that provide a cellular texture and is approximately 0.125 inches thick. The third rectus muscle layer 52 is made of solid EVA foam having a red color and is approximately 1 millimeter thick. The posterior rectus sheath layer 54 is made of solid EVA foam that is white in color and is approximately 1 millimeter thick. The *transversalis* fascia layer 56 is made of cellular polyethylene foam that is white in color and approximately 0.25 inches thick. The fascia layer 56 has a cellular texture arising from the cellular polyethylene foam as opposed to the solid EVA foam layers. The peritoneum layer 58 is made of solid EVA foam that is white in color and approximately 1 millimeter thick. The inferior epigastric vein and artery layer 60 layer include solid or hollow elongate cylindrical structures made of silicone or Kraton® polymer or other elastomer having a cross-sectional diameter of approximately 0.15 inches. The arteries are red in color and the veins are blue in color. The layers as described above provide an optical entry with a very realistic appearance to the end user. Cellular polyethylene foam is also called closed cell polyethylene foam.

Turning now to FIG. 6, there is shown a top planar view that is representative of the fat layer 44, the posterior rectus sheath layer 54, the *transversalis* fascia layer 56 and the peritoneum layer 58. These layers are approximately six inches wide and six and a half inches long. The fat layer 44, the posterior rectus sheath layer 54, the *transversalis* fascia layer 56 and the peritoneum layer 58 all have a circular aperture 66 that is approximately one inch in diameter. The aperture 66 is located approximately two inches from one side and is in the same place in all of these layers 44, 54, 56, 58 such that when overlaid the apertures 66 line up to provide a pathway for the umbilical stalk 42 across these layers.

Figure 7:
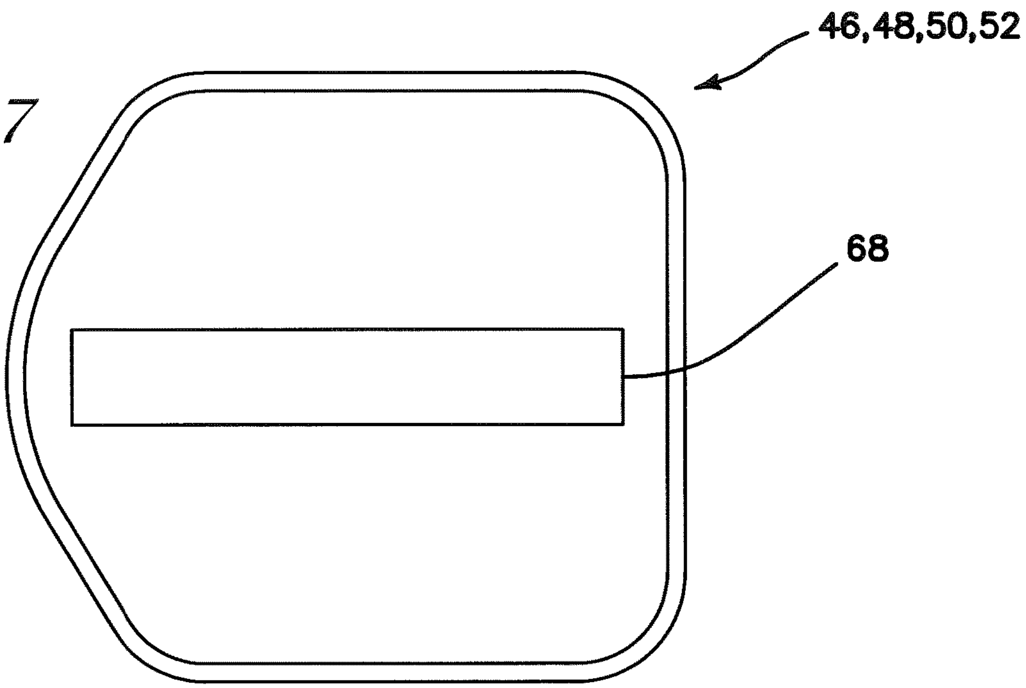
FIG. 7 is a top planar view that is representative of more than one layer in an anatomical portion of a first entry model according to the present invention.

Turning now to FIG. 7, there is shown a top planar view that is representative of the anterior rectus sheath layer 46, first rectus muscle layer 48, the second rectus muscle layer 50 and the third rectus muscle layer 52. These layers are approximately six inches wide and six and a half inches long. The anterior rectus sheath layer 46, first rectus muscle layer 48, the second rectus muscle layer 50 and the third rectus muscle layer 52 all have an elongate opening 68. The elongate opening 68 extends along the center line of the layers and is shown in FIG. 7 to be a rectangular cut out that is approximately one inch wide and 5.75 inches long. When the layers 46, 48, 50, 52 are overlaid, one on top of the other, all of the respective openings 68 are aligned. When the layers 46, 48, 50, 52 are overlaid with the other layers 44, 54, 56, 58, the apertures 66 are in communication or alignment with the elongate openings 68. The elongate opening 68 represents the linea alba of the abdomen.

Figure 8:
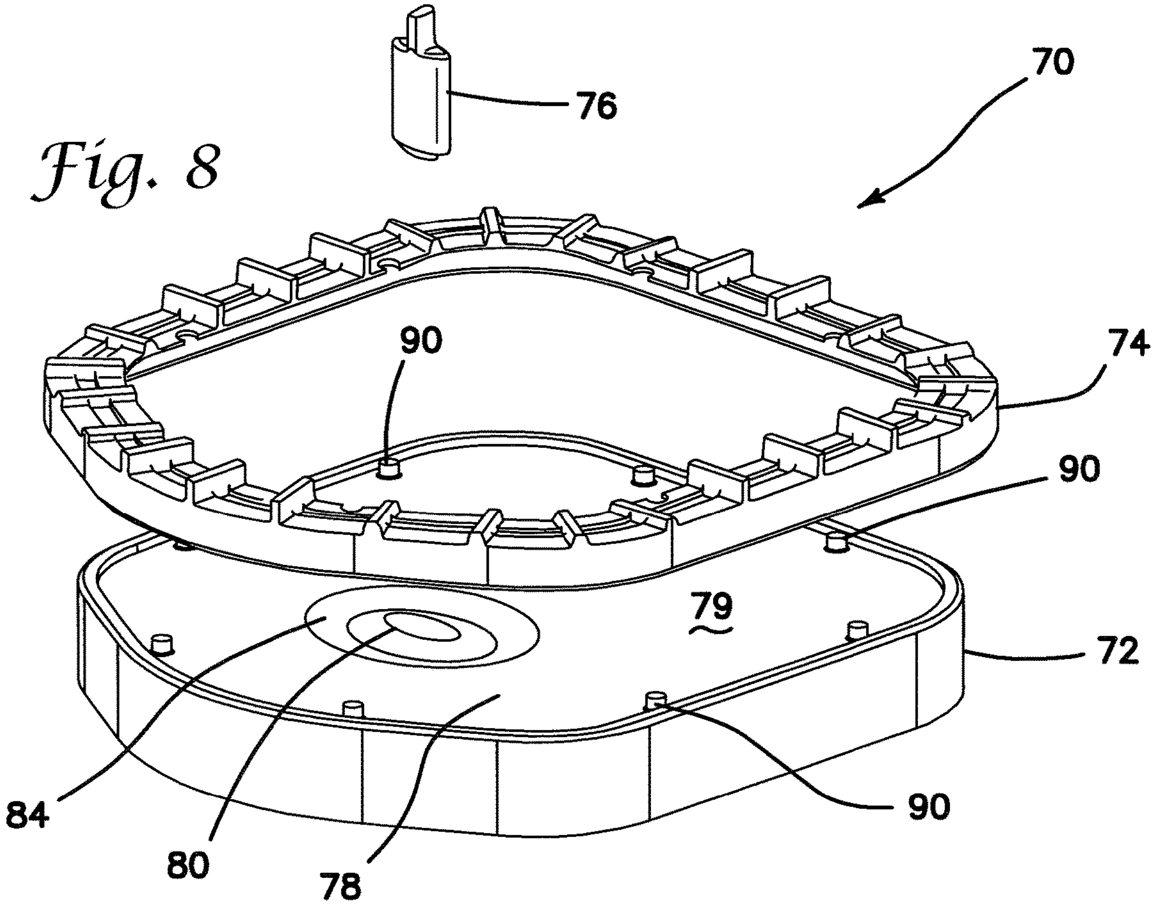
FIG. 8 is top perspective, exploded view of a mold for a skin layer of a first entry model according to the present invention.
Figure 9:
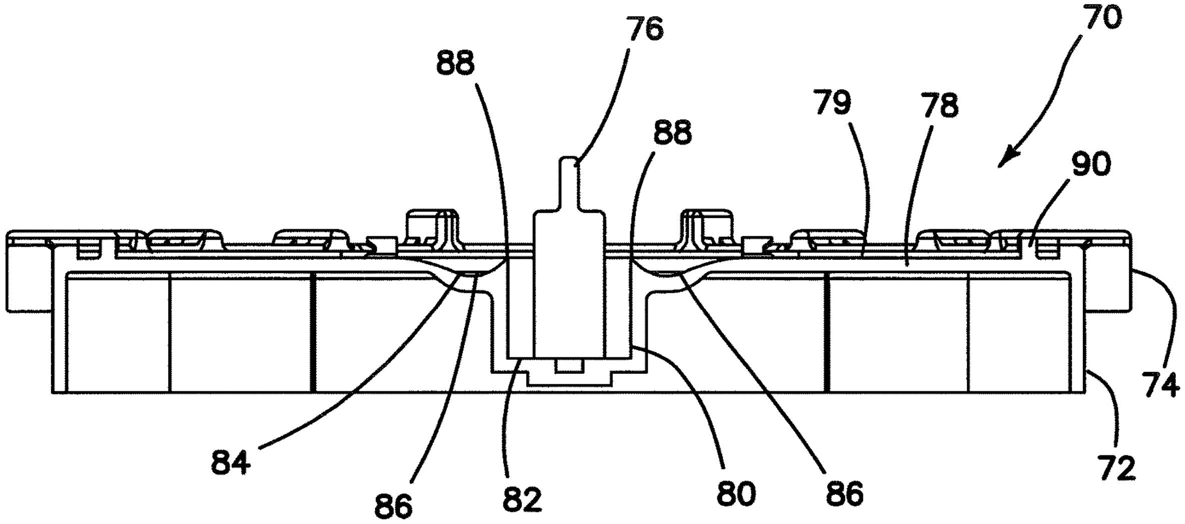
FIG. 9 is a side, cross-sectional view of a mold for a skin layer for a first entry model according to the present invention.
Figure 10:
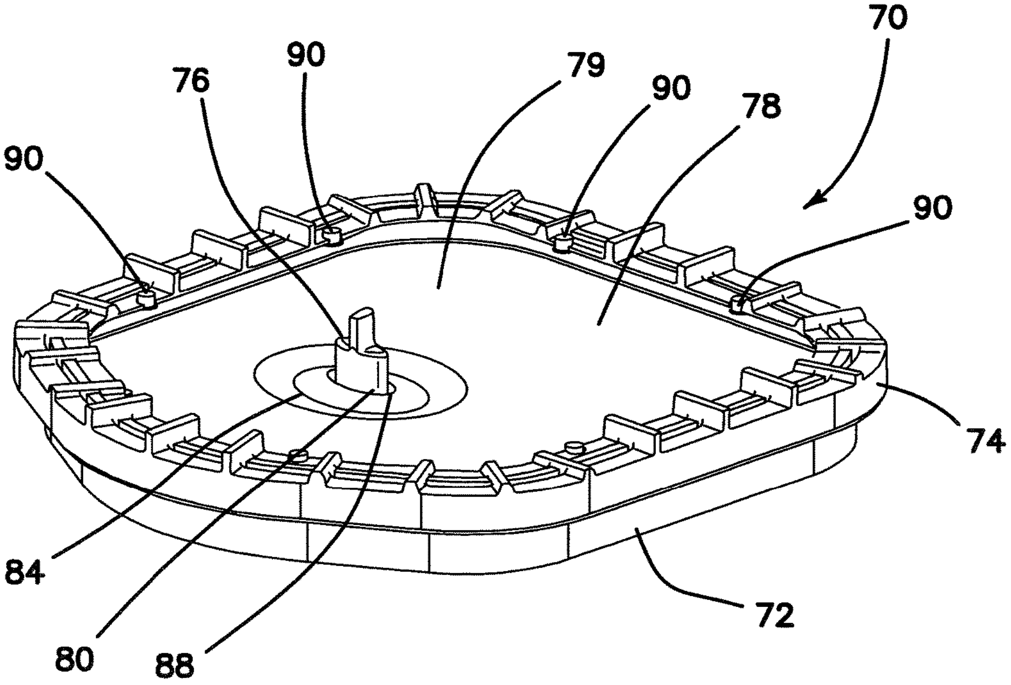
FIG. 10 is a top perspective view of a mold for a skin layer for a first entry model according to the present invention.

With reference back to FIG. 4 and additional reference to FIGS. 8-10, the skin layer 40 is formed by pouring the uncured and dyed silicone or thermoplastic elastomer into a special mold 70. An exploded, top perspective view of the mold 70 is shown in FIG. 8. The mold 70 includes a base 72, a top 74, and a core 76. The base 72 of the mold 70 includes a cavity 78 for receiving the plastic material. The cavity 78 is polygonal and substantially rectangular in shape. The cavity 78 includes a first floor 79 that surrounds a well 80 having a second floor 82. The second floor 82 of the well 80 is approximately 1 inch below the first floor 79 and includes a hole for inserting the core 76 inside the well 80. The cross-section of the well 80 is elliptical in shape having a long axis of approximately 1 inch and a short axis of approximately half an inch. The cross-section of the core 76 is also elliptical in shape, complementary to the well 80. The core 76 has a long axis of approximately 0.75 inches and a short axis of approximately 0.25 inches. With the core 76 in place inside the well 80 a space of approximately ⅛ inch is formed all around the core 76 between the outer surface of the core 76 and the inner surface of the well 80 into which silicone or thermoplastic elastomer is poured to form a tubular structure of the umbilical stalk 42*a* having an opening 92. The core 76 is approximately one inch and a half in length and extends above the pour line when inside the well 80.

The mold cavity 78 further includes a circumferential well 84 that is formed circumferentially around the first well 80. The circumferential well 84 has a concave or curved floor 86 that is approximately ⅛ inch deeper from the first floor 79. When silicone or thermoplastic elastomer is poured, an elliptical toroidal shape with a flat top is formed in the plastic material resulting in an increased thickness of material of approximately 0.25 inch in the area of the circumferential well 84 in the final product. The circumferential well 84 has an inner perimeter 88 that coincides with the wall of the first well 80. The annular distance from the inner perimeter 88 of the circumferential well 84 to the outer perimeter or end of circumferential well 84 is approximately 0.75 inches. The base 72 of the mold 70 further includes a plurality of pegs 90 upstanding from the first floor 79 to form holes in the resulting molded material. Although the first well 80 is described to have an elliptical shape, in another variation it is circular in shape with a corresponding circular core and circular circumferential well.

The core 76 is first inserted into the well 80 and silicone or thermoplastic elastomer is poured into the base 72 of the mold 70. The silicone or thermoplastic elastomer will run into the well 80 forming a tubular structure defined by the space between the core 76 and wall of the well 80. The silicone or thermoplastic elastomer will also run into the circumferential well 84 and cover the concave floor 86 forming a substantially toroidal shape of increased thickness of approximately 0.25 inch. The circumferential portion of increased thickness 94 is visible in FIGS. 4 and 5. The silicone or thermoplastic elastomer in its liquid state will cover the first floor 79 forming a planar area having a thickness of approximately ⅛ inch. The top 74 of the mold 70 will be placed over the base 72 of the mold 70. The top 74 is configured to cover only the perimeter of the poured silicone or thermoplastic elastomer to reduce the thickness of the silicone around the perimeter.

After the silicone or thermoplastic elastomer has solidified, the top 74 of the mold is removed and the molded silicone or thermoplastic elastomer is removed from the mold 70. The core 76 is also removed from the material leaving an elliptical opening 92 through the skin layer 40. The tubular structure or umbilical stalk 42*a* that is integrally formed by the well 80 with the rest of the skin layer 40 defines an opening 92 and is elliptical in shape having long axis of approximately 0.75 inches and a short axis of approximately 0.25 inches with a wall thickness of approximately ⅛ inch. The tubular structure 42*a* is inverted, that is, it is pushed through the opening 92 such that the surface in contact with the floor 79 of the mold 70 becomes the skin layer top surface 62. This advantageously permits the floor 79 of the mold to include texturing that would impart skin-like texture to the skin layer top surface 62. Also, by inverting the tubular structure 42*a*, not only an umbilical stalk is formed, but also, the portion of increased thickness 94 of the skin layer 40 will advantageously create a raised surface at the skin layer top surface 62 which is clearly visible in FIGS. 4 and 5. This raised portion 94 advantageously provides extra thickness of material for drawing sutures through and maintaining them in position without pulling through the silicone or thermoplastic material. Also, a circumferential raised portion 94 that surrounds the opening 92 creates a realistic belly-button effect that can be seen in FIG. 1. A variation of the skin layer 40 without the raised circumferential portion 94 is shown in FIG. 2. Although the umbilical stalk is approximately one inch long, it may be molded to be longer, approximately 1.25 inches to approximately 2.0 inches long. The skin layer 40 is planar sheet of molded material having a top surface 62 and a bottom surface 64 defining a skin layer thickness of approximately 0.1 inches. The skin layer 40 further includes an opening 92 with a tubular extension 42 integrally formed at opening 92 and interconnected with the rest of the layer 40. Surrounding the opening 92 is a circumferential raised portion 94 of increased thickness of approximately 0.2 inches. The raised portion 94 provides a convex outer surface that transitions into the remainder of the top surface 62 of the skin layer 40.

The mold 70 is 3D printed from Vero White Plus Fullcure 835 material. The distance from the pour line to the floor 79 is approximately 0.1 inches to create a skin layer thickness of approximately 0.1 inches. Around the perimeter, the thickness beneath the top 74 of the mold 70 is reduced to approximately 0.05 inches for a resulting skin layer thickness at the perimeter having a reduced thickness of approximately 0.05 inches which facilitates connection to the frame support 14. At the circumferential well 84 location, the thickness of the resulting skin layer 40 is approximately 0.2 inches. First, the mold 70 is sprayed with mold release solution and allowed to dry. In one variation, approximately 5 grams of Dragon Skin Silicone comprising 2.5 grams of part A and 2.5 grams of part B is mixed. Alternatively, a thermoplastic elastomer such as Kraton CL2003X is used for its cost savings and its ability to be sutured. Approximately 20 microliters of fleshtone color is mixed into the silicone. The core 76 is inserted into the well 80 and the silicone mixture is poured into the mold base 72. The mixture is spread evenly up to a pour line making sure all the wells are filled. The top 74 is placed over the base 72 of the mold 70. Excess silicone mixture is cleaned away and the silicone inside the mold 70 is allowed to dry for approximately one hour under a heat lamp or for two hours without a heat lamp.

After the silicone mixture has dried, the top 74 is removed and the formed skin layer 40 is peeled and removed from the base 72. The core 76 is also removed. The integrally formed umbilical stalk 42 is inverted by passing it through a formed opening 92. Silicone adhesive is provided and delivered using a syringe to the inside of the tube of the umbilical stalk 42. One or more clamps and in one variation, three clamps, such as binder clips, are used to clamp the inverted umbilical stalk 42 closed and sealed to create a bellybutton shape having a star or Y-shaped closure as shown in FIG. 1 or 2. The bottom-most part of the umbilical stalk 42 is clamped to create a deep umbilicus as opposed to clamping closer to the skin layer bottom surface 64. The skin layer 40 is turned over and excess glue that may have seeped out of the umbilicus 42 is removed. The adhesive is allowed to dry for approximately one hour and the clamps are removed. In one variation, an umbilical shaft 42*b* is provided. The umbilical shaft 42*b* is tubular having a central lumen and made of a thin layer of white silicone that is approximately 1 mm thick. The umbilical shaft 42*b* is glued to the umbilical stalk 42*a* to extend the umbilicus deeper into the layers and create a more realistic look and feel. The umbilical shaft 42*b* is glued to the umbilical stalk 42*a* such that the lumens interconnect. The proximal end of the umbilical shaft 42*b* is place over the stalk 42*a* and glued thereto and the distal end of the umbilical shaft 42*b* is free. In another variation, the distal end of the umbilical shaft is glued or integrally formed with the peritoneum layer 58.

All of the layers are properly oriented in the same direction and aligned such that the apertures 66 and openings 68 are superimposed. Then, with the skin layer 40 inverted and the umbilical stalk 42*a* either alone or with an extended umbilical shaft 42*b* is passed through the circular aperture 66 of the fat layer 44 and through the elongate openings 68 of the anterior rectus sheath layer 46, the first rectus muscle layer 48, the second rectus muscle layer 50, and the third rectus muscle layer 52 and then through the circular apertures 66 of the posterior rectus sheath layer 54, the *transversalis* fascia layer 56 and the peritoneum layer 58 as shown in FIG. 5. In one variation, the umbilicus 42 is left meeting the peritoneum layer 58 or in another variation, the umbilicus 42 is attached with adhesive to the peritoneum layer 58 and yet in another variation, integrally molded with the peritoneum layer 58. The inferior epigastric vein and artery layer 60 is optionally included. This layer 60 can be formed as a layer having a circular aperture 66 with embedded arteries and veins or simply comprise a pair of cylindrical silicone structures, one red and one blue, placed on one side of the midline and another pair of cylindrical silicone structures, one red and one blue in color, placed on the other side of the midline as shown in FIG. 4. The cylindrical silicone structures representing the epigastric veins and arteries are glued to at least one of the adjacent posterior rectus sheath layer 54 and the *transversalis* fascia layer 56. A price tag holder or other fastener can then be used to connect the layers together as shown in FIG. 5 with the umbilicus 42 shown protruding from the aperture 66 in the bottom-most peritoneum layer 58.

As can be seen in FIG. 5, the skin layer 50 and the peritoneum layer 58 is slightly larger than the other internal layers 44, 46, 48, 50, 52, 54, 56. In particular, the skin layer 50 and peritoneum layer 58 are larger by approximately 1.25 inches in length and width. Whereas the internal layers are approximately 6.5 inches long and 6 inches wide, the peritoneum layer 58 and skin layer 40 is approximately 8 inches long and 7.5 inches wide. These extra length and width portions are captured between the top and bottom frames of the support 14. Pegs in one of the top or bottom frames are passed through apertures in the skin layer 40 formed by mold pegs 90. The peritoneum layer 58 may also include apertures for passing of frame pegs. The top frame and bottom frame are then heat staked together capturing the anatomical portion 12. The resulting model 10 is approximately 1.5 inches thick.

The first entry model 10 is then placed inside an opening in the top cover 22 of a laparoscopic trainer 20 and securely attached. Laparoscopic first entry procedures such as the ones discussed in the background of this specification are then practiced on the model 10 employing one or more of the trocar instruments described above creating first entry in any of the locations described above including first entry directly through the umbilicus. Another location for first entry could be within a half inch on either side of the midline. Although such first entry is not surgically preferred, the practitioner will advantageously and quickly recognize a mistaken first approach when only the skin layer 40, the fat layer 44 and posterior rectus sheath 54 and peritoneum 58 layers are observed at the linea alba. The absence of a pink-colored first rectus muscle layer 48 should immediately alarm the practitioner during practice that penetration is at a wrong location. Another location for first entry penetration can take place at the left upper quadrant or right upper quadrant. As mentioned above, the left upper quadrant is different from the umbilicus region in that there are muscle layers. While penetrating at the upper right or left quadrants, the practitioner will observe the following layers: the skin layer 40, the fat layer 44, the anterior rectus sheath layer 46, the first rectus muscle layer 48, the second rectus muscle layer 50, the third rectus muscle layer 52, the posterior rectus sheath layer 54, the *transversalis* fascia layer 56 and the peritoneum layer 58. The layers are configured such that first entry through the umbilicus 42 will not penetrate any of the layers or will only penetrate the skin layer 40.

Figure 11:
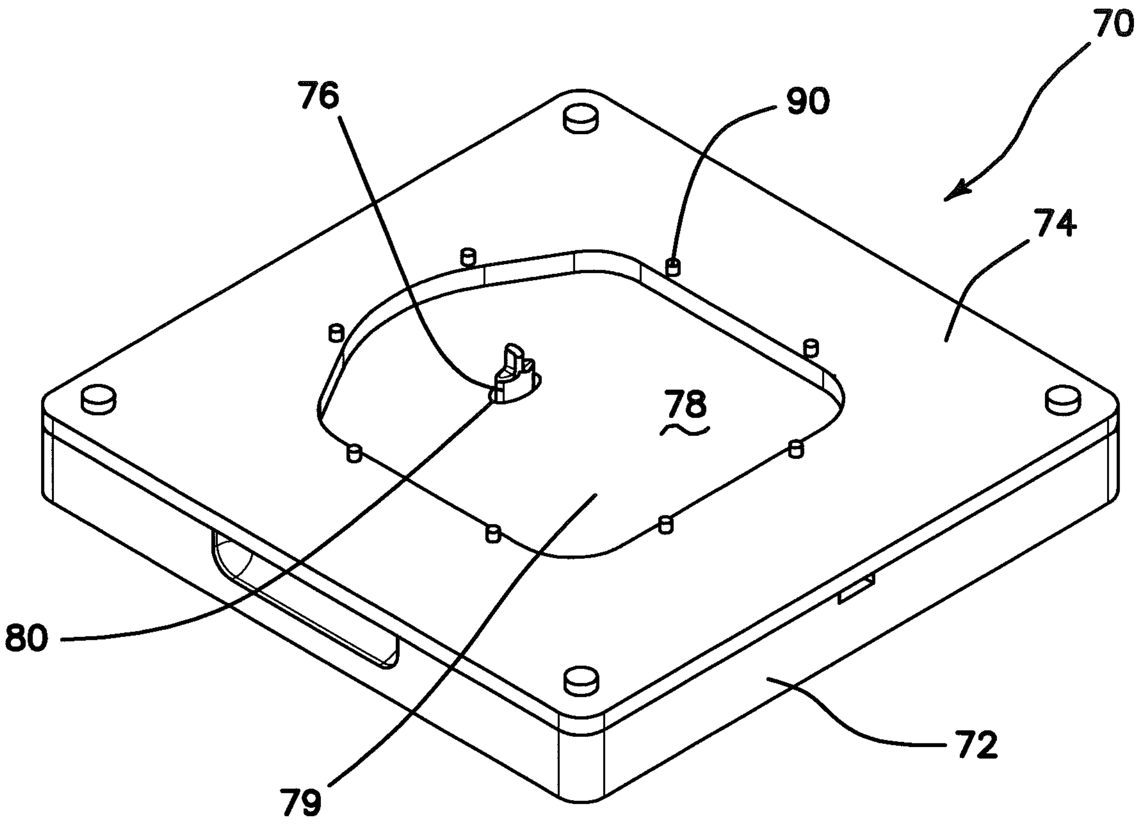
FIG. 11 is a top perspective view of a mold for a skin layer for a first entry model according to the present invention.
Figure 12:
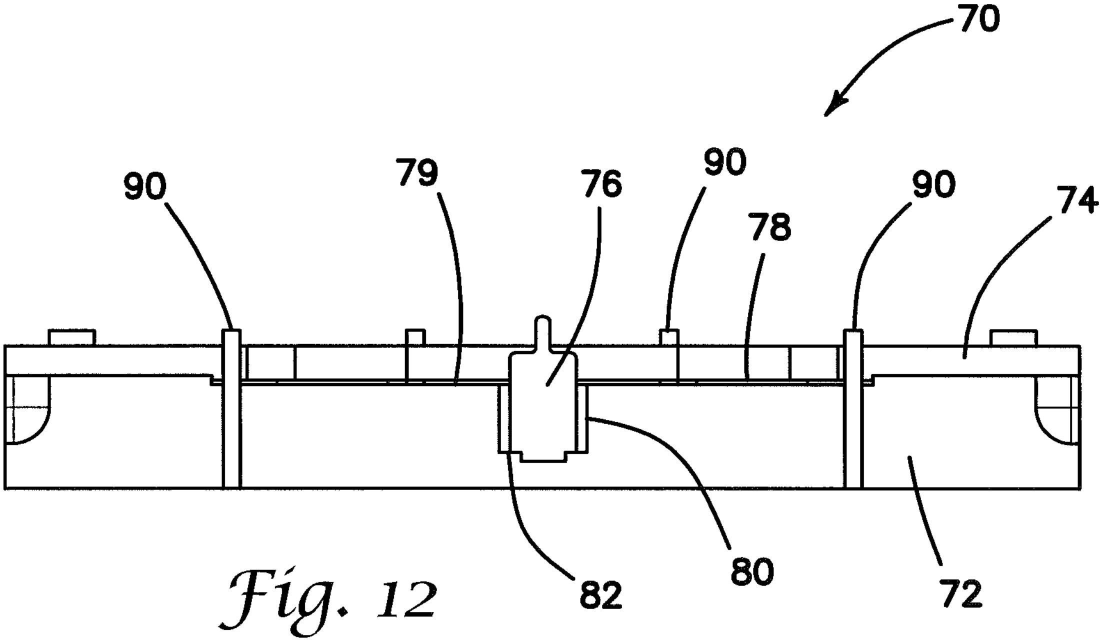
FIG. 12 is a side, cross-sectional view of a mold for a skin layer for a first entry model according to the present invention.

With reference to FIGS. 11-12, there is shown an alternative mold 70 according to the present invention that is used to create the skin layer 40. The mold 70 is made of a polymer known as Delrin® and includes a base 72, a top 74, and a core 76. The base 72 of the mold 70 includes a cavity 78 for receiving the plastic material. The cavity 78, which is approximately 0.1 inches deep, is in the shape of a large abdominal wall frame configured to hold all the layers of the model. The cavity 78 includes a first floor 79 that surrounds a well 80 having a second floor 82. The second floor 82 of the well 80 includes a hole for inserting the core 76 inside the well 80. The cross-section of the well 80 is elliptical in shape having a long axis of approximately 1 inch and a short axis of approximately half an inch. The well 80 is approximately three inches from one side of the cavity 78 and approximately three inches from the curved side of the cavity 78 and approximately 0.75 inches deep. The well 80 includes a secondary well at the second floor 82 which is also an ovular cutout that has a long axis of approximately 0.5 inches and a short axis of approximately 0.2 inches and approximately 0.1 inches deep. The secondary well is used to align the core 76 within the well 80. Although the first well 80 is described to have an elliptical shape, in another variation, the first well 80 is circular in shape with a corresponding circular core.

The cross-section of the core 76 is also elliptical in shape, complementary to the well 80. In a cross-section taken perpendicular to the longitudinal axis of the core 76, the core 76 has a long axis of approximately 0.75 inches and a short axis of approximately 0.25 inches. With the core 76 in place inside the well 80 a space of approximately ⅛ inch is formed all around the core 76 between the outer surface of the core 76 and the inner surface of the well 80 into which silicone or thermoplastic elastomer is poured to form a tubular structure of the umbilical stalk 42*a* having an opening 92. The core 76 is approximately one inch and a half in length and extends above the pour line when inside the well 80. The base 72 of the mold 70 further includes a plurality of pegs 90 for forming apertures through which pegs will pass for securing the skin layer 40 to the frame 14.

The core 76 is first inserted into the well 80 and silicone or thermoplastic elastomer is poured into the base 72 of the mold 70. The silicone or thermoplastic elastomer will run into the well 80 forming a tubular structure defined by the space between the core 76 and wall of the well 80. The silicone or thermoplastic elastomer in its liquid state will cover the first floor 79 forming a planar area having a thickness of approximately ⅛ inch. The top 74 of the mold 70 will be placed over the base 72 of the mold 70. The top 74 includes a through-hole having the same shape as the cavity 78 but sized slightly larger so as to cover only the perimeter of the poured silicone or thermoplastic elastomer. The top 74 includes a lip of approximately 0.39 inches in length that extends vertically approximately 0.05 inches. The lip is configured to create a flat edge around the skin layer that is only 0.05 inches allowing the skin layer to be easily heat staked in the location of the edge after assembly.

Figure 13:
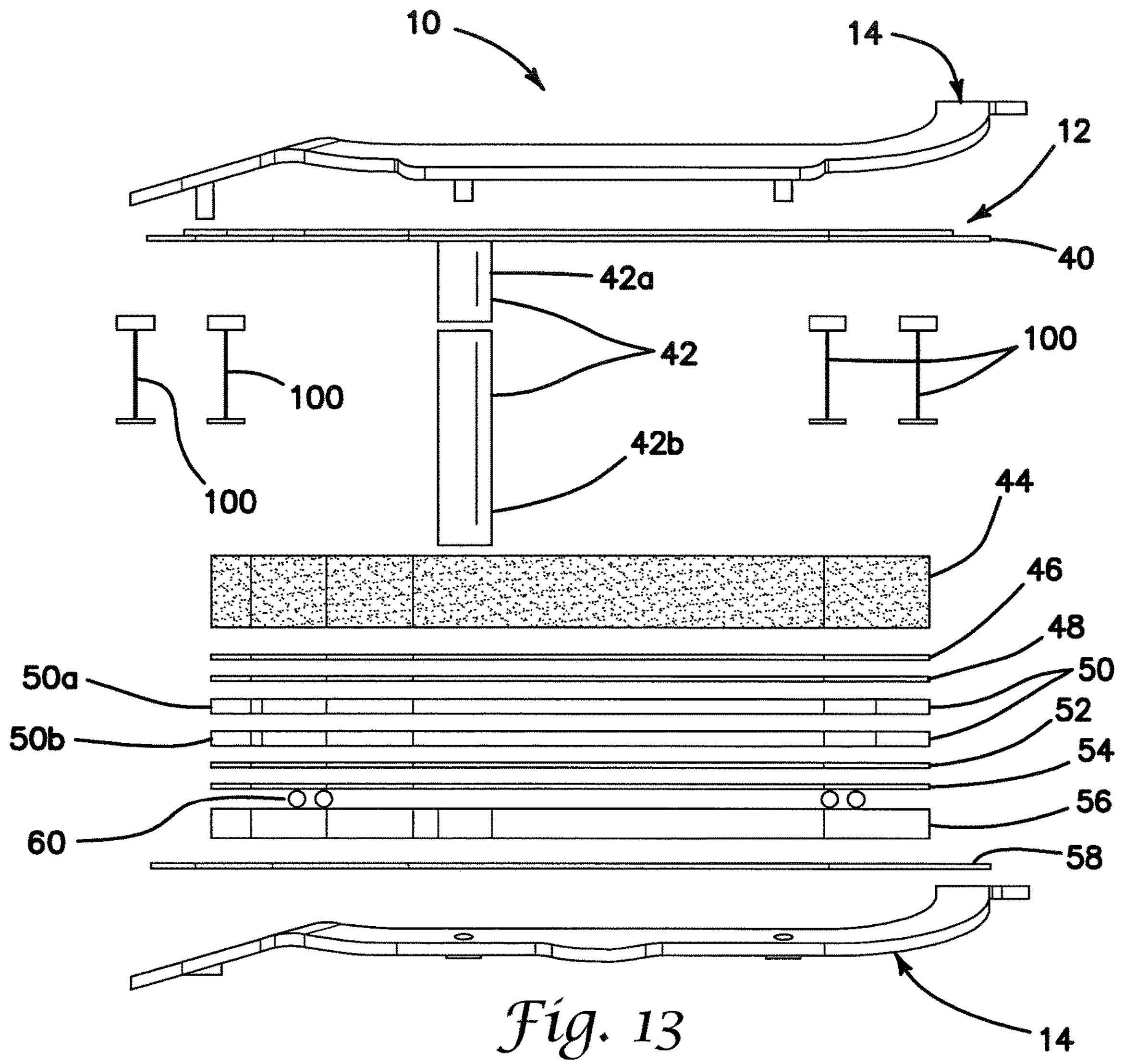
FIG. 13 is an exploded view of a first entry model according to the present invention.
Figure 14:
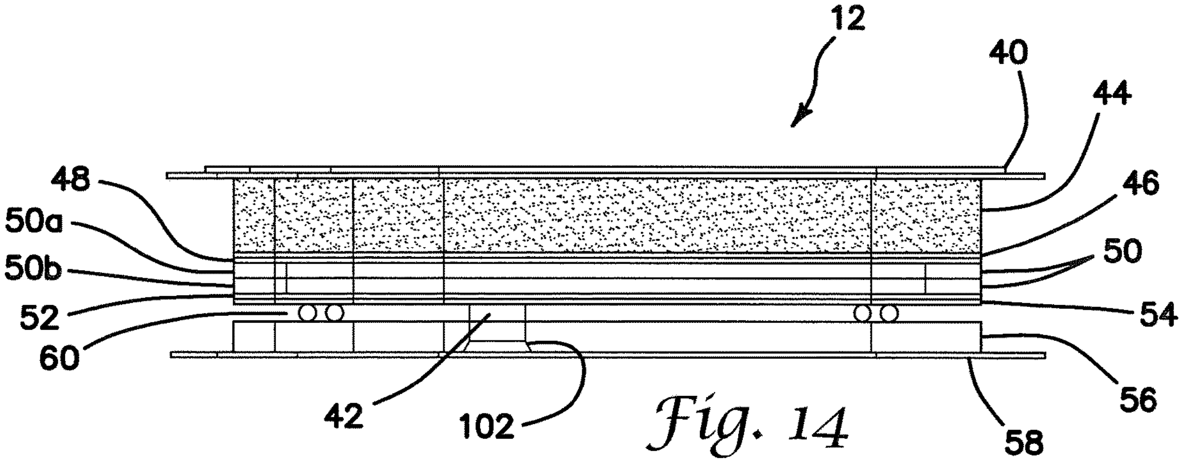
FIG. 14 is a side view of an anatomical portion of a first entry model according to the present invention.

Turning now to FIGS. 13 and 14, another variation of first entry model 10 will now be described with like reference numbers used to describe like parts. The model 10 includes an anatomical portion 12 connected between two parts of a frame-like support 14. The frame-like support 14 includes a top frame having protrusions that snap through the skin layer 40 and into apertures formed in a bottom frame. The anatomical portion 12 includes a skin layer 40, an umbilical stalk 42, a fat layer 44, an anterior rectus sheath layer 46, a first rectus muscle layer 48, a second rectus muscle layer 50, a third rectus muscle layer 52, a posterior rectus sheath layer 54, a *transversalis* fascia layer 56, and a peritoneum layer 58. The layers 40, 44, 46, 48, 50, 52, 54, 56, 58 are placed one on top of the other as shown in FIGS. 13-14 with the umbilical stalk 42 penetrating through all of the layers beneath the skin layer 40 except for the peritoneum layer 58. The layers 40, 44, 46, 48, 50, 52, 54, 56, 58 are connected together with adhesive or other fastener. In one variation, the layers 40, 44, 46, 48, 50, 52, 54, 56, 58 are connected with at least one price-tag holder 100 punched through the layers and sandwiched between the skin layer 40 and the peritoneum layer 58 before being attached to the frame 14. In another variation, the layers are held together without adhesive or other fastener and clamped between the top frame and bottom frame. An optional inferior epigastric vein and artery layer 60 is included between the posterior rectus sheath layer 54 and the *transversalis* fascia layer 56 as shown in FIGS. 13-14.

With continued reference to FIGS. 13-14, the skin layer 40 is molded of silicone or thermoplastic elastomer (TPE) dyed with a flesh color. The skin layer 40 includes a top surface and bottom surface defining a thickness of approximately 0.1 inches. The skin layer 40 includes an integrally formed tubular umbilical stalk portion 42*a* having a central lumen formed by the core 76 during the molding process. An umbilical shaft 42*b* may be formed together with the umbilical stalk 42*a* or connected to the umbilical stalk 42*a* or placed as a separate tubular portion within the anatomical portion 12. The umbilical stalk 42 is made of a thin layer of white silicone that is approximately 1 millimeter thick. The umbilical stalk 42*a* by itself or together with the umbilical shaft 42*b* is configured to be long enough to travel through all the layers 44, 46, 48, 50, 52, 54 and 56 until it reaches between the *transversalis* fascia layer 56 and the peritoneum layer 58. The distal end of the umbilical stalk 42 (or umbilical shaft 42*b* if one is employed) is cut one or more times such that the cut extends from the distal end of the umbilical stalk towards the proximal end of the umbilical stalk. Several cuts are provided at a length to sufficiently flare the distal end of the umbilical stalk. In one variation, four or more cuts are formed to form four or more pieces or flaps at the distal end of the simulated umbilicus 42. These flaps 102 are fanned out over the distal-facing surface of the *transversalis* fascia layer 56 as shown in FIG. 15. The umbilical stalk 42 is adhered to the *transversalis* fascia layer 56 using two types of adhesive. Because the *transversalis* fascia layer 56 is made of cellular polyethylene foam which is porous, the surface insensitive cyanoacrylate glue cannot be used alone to adhere the silicone because it will burn through the foam and not adhere. Therefore, a heavy duty spray adhesive is sprayed on the foam *transversalis* fascia layer 56 and allowed to dry for a few minutes. The surface insensitive cyanoacrylate glue is then placed on the silicone umbilical stalk 42 and the distal flaps 102 of the stalk 42 are adhered to the distal-facing surface of the *transversalis* fascia layer 56. The spray adhesive, which alone is not strong enough to bond the foam and the silicone, protects the foam from the cyanoacrylate.

Still referencing FIGS. 13-14, the fat layer 44 needs to react similarly to real fat when grasped or touched externally and it needs to look like fat under optical entry and to respond physically like to fat when pierced internally. In one variation, the fat layer 44 is made of cellular foam that is porous, sponge-like and yellow in color. The yellow foam looks like fat under optical entry. In another variation, the fat layer 44 is made of polyurethane foam that is yellow in color. Memory foam is polyurethane with additional chemicals increasing its viscosity and density. It is also called viscoelastic polyurethane foam or low-resilience polyurethane foam or polyurethane foam having a slow recovery. The memory foam feels realistic when the user touches the model 10 at the skin layer 40 and also when the user enters the fat layer 44 optically with a trocar. When illuminated, the polyurethane fat layer 44 shines advantageously creating the illusion that the fat is wet internally. Additionally, when the fat layer 44 is cut, the polyurethane foam recovers its shape. The ability of the fat layer 44 to recover its shape is important for the Hasson cut-down technique because the surgeon must practice retracting the fat layer 44 before cutting the fascia. The practice is more realistic if the fat layer 44 tends to return to its original location requiring the practitioner to retract the fat layer 44. In another variation, the fat layer 44 is made of a thermoplastic elastomer (TPE) with an additive such as baking soda or mineral oil to create a material that acts more like real fat. An additive such as baking soda will create a porous fat layer allowing the trocar to easily pierce and enter the fat layer 44 and advantageously provide a more realistic appearance under optical entry. An additive such as mineral oil will create a gel that has the shape-recovery characteristics similar to the memory foam but provides a more realistic feel when touched externally. TPE with either the mineral oil or baking soda as an additive provides a tactile response similar to fat when grasped. The fat layer 44 is approximately 1.5-4.0 cm thick in a standard model 10. An obese model 10 will be described hereinbelow.

In another variation of the model, the skin layer 40 is attached to the fat layer 44. In particular, the skin layer 40 is cast over the fat layer 44. The silicone or TPE of the skin layer 40 will adhere to the fat layer 44 located directly below the skin layer 40 as it cures/cools. In such a variation, the mold 70 is made deeper to receive the fat layer 44. As described above with respect to another variation in which the umbilical stalk is inverted to create a realistic umbilicus, this variation in which the skin layer 40 is attached to the fat layer 44, the umbilical stalk cannot be inverted because the silicone or the TPE is poured over the fat layer and attaches thereto as it cures. Therefore, the core 76 is a different shape than described above with respect to FIGS. 11-12. Instead, the core 76 is shaped such that the cured silicone results in a shape that simulates an inverted umbilicus. For example, the top of the core 76 may be provided with a recess with texturing that simulates the belly button as viewed from outside the patient. The fat layer 44 is placed into the mold base 72 that is modified with a larger receptacle for receiving a fat layer 44 and the silicone or TPE is be poured over it and then the umbilicus-shaped core 76 may be previously placed into a well or is placed on top to mold the umbilicus shape into the silicone skin layer 40 without inverting or gluing a lumen of the umbilical stalk 42. In this variation, the step of inverting the skin layer 40 and pinched together to create the umbilicus shape would not be needed.

Figure 16B:
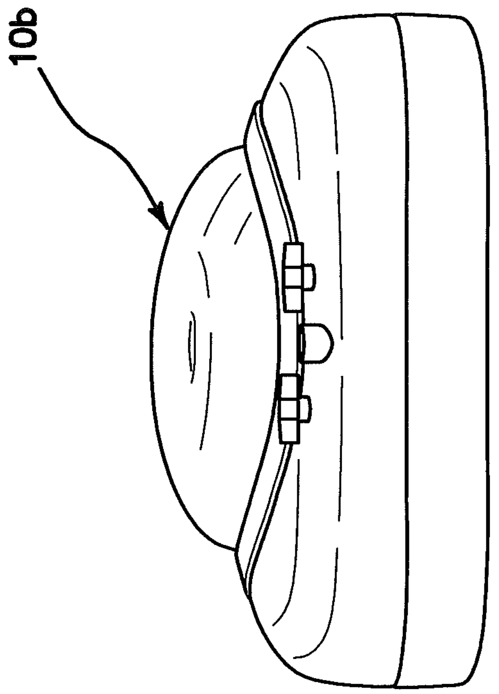
FIG. 16B is an end view of an obese first entry model connected to a top cover of a trainer according to the present invention.
Figure 16A:
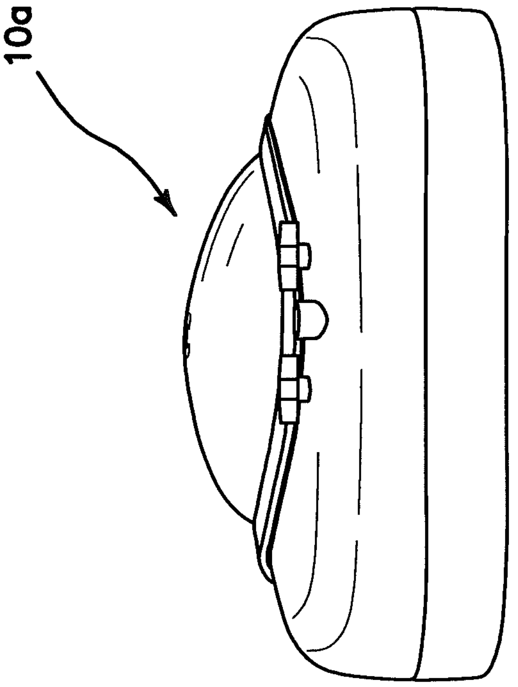
FIG. 16A is an end view of a standard first entry model connected to a top cover of a trainer according to the present invention.

In addition to a model with a normal abdominal wall anatomy, an obese model is provided in the present invention. The obese model includes all of the same layers as shown in FIGS. 13-14 but includes a fat layer 44 that is significantly thicker. The fat layer 44 of the obese model can be made of the same materials already described herein. Whereas the thickness of the standard fat layer 44 is approximately 1.5 to 4.0 cm, the fat layer 44 in the obese model is approximately 4.0 to 7.0 cm. The obese model also includes a special skin layer 40. The skin layer 40 can be made as previously stated herein and be of the same size in the x-y plane as the skin layer in the standard model or the same size in the x-y plane as the fat layer in the obese model or, alternatively, the skin layer 40 can be larger in size with respect to the size of the fat layer of the obese model in the x-y plane or larger in size with respect to the size of the fat layer of the standard model. If the skin layer is the same size and shape, the obese model 10*b* will have a domed effect as can be seen in FIG. 16B when compared to a standard model 10*a* illustrated in FIG. 16A. The same-sized skin layer 40 in combination with the thicker fat layer 44 or otherwise a skin layer 40 that is the same size or is slightly smaller than the dimensions of the fat layer 44 will result in the thicker fat layer(s) 44 of the obese model being compressed into the same space previously made for the standard model. This compression provides the obese model 10A with the appearance of an obese patient when using any of the four laparoscopic entry techniques. However, the obese model 10A will not be easily and realistically grasped with the smaller and tighter skin layer 40 encompassing the larger fat layer 44; however, a larger skin layer 40 can be employed. If TPE or memory foam is used for the fat layer 44, the larger skin layer 40 will allow the fat layer 44 to expand into the extra space of a larger skin layer 40 when gasped and moved. Advantageously, the ability of the fat layer to move freely under the skin layer allows the surgeon to grasp the fat layer and pull at the umbilicus creating a more realistic entry. FIGS. 16A and 16B illustrate a laparoscopic trainer 20 with legs 26 removed such that the top cover 22 is seated directly onto the base 24 of the trainer 20 reducing the size of the cavity 28 such that first entry procedures may be more easily and conveniently practiced. The top cover 22 forms a shell over the base 24 and fits securely around an upstanding lip so that the top cover 22 does not dislocate with respect to the base 24. The first entry model 10 is inserted into an aperture 30 in the top cover 22 of the trainer 20 and a simulated organ is placed into the cavity 28 of the trainer 20 such that when a practitioner enters through the first entry model 10 by piercing the various layers, the practitioner will see the simulated organ located within the cavity 28. One or more organs may be placed inside the cavity 28. In one variation, at least a simulated omentum is provided inside the cavity 28. The simulated omentum is made of a sheet of fabric or thin layer of silicone. The sheet is placed inside the cavity 28 of the trainer 20 and the sheet is configured such that when the first entry model 10 is pierced by an instrument such as an optical trocar having a laparoscope inserted into the trocar, the practitioner will see the sheet on the video display monitor. In one variation, the sheet is suspended within the cavity 28 using clips attached to the trainer 20. Alternatively, the sheet may be placed on a frame or just laid over the base. The thin sheet of material, representing the omentum, is yellow in color and loosely connected to the trainer and is configured such that it would flutter when insufflation gasses are delivered into the cavity such as with an insufflation trocar after piercing the first entry model 10. In such a case, the representative omentum layer is attached to the trainer selectively leaving portions of the simulated omentum unattached to enable the flutter effect. The presence of the simulated omentum layer comprising a thin sheet is advantageous because when a surgeon first enters into the abdominal cavity and insufflation is delivered to expand the abdomen in order to create a working space, the surgeon knows that the abdominal wall was successfully entered when visually the representative omentum or viscera is observed and further seen fluttering with the force of insufflation gasses. This training feature is advantageously provided in the present invention in the combination of the first entry model 10, a trainer 20 and simulated omentum such as that depicted in FIG. 3 or FIGS. 16A and 16B of the present invention. Use of the simulated omentum sheet with the trainer 20 configured as shown in FIGS. 16A and 16B advantageously provides a smaller space for the cavity 28, creating a more air-tight and dark location to simulate insufflation and observe the fluttering of the simulated omentum.

With reference back to FIGS. 13-14 and with reference to Table 1 below, the anterior rectus sheath layer 46 is made of solid ethylene vinyl acetate (EVA) foam having a white color and is approximately 1 millimeter thick. The first rectus muscle layer 48 is made of solid EVA foam and is red in color and approximately 1 millimeter thick. The second rectus muscle layer 50 is made of cellular polyethylene foam having a pink color. In one variation, the second rectus muscle layer 50 comprises two layers 50*a*, 50*b* of cellular polyethylene foam having a total thickness of approximately 0.25 inches. The second rectus muscle layer 50 is cellular foam that includes air bubbles that provide a cellular texture. Each second rectus muscle layer 50*a*, 50*b* is approximately 0.125 inches thick. The third rectus muscle layer 52 is made of solid EVA foam having a red color and is approximately 1 millimeter thick.

In one variation, the posterior rectus sheath layer 54 is not made of foam material, but instead, is made of an interfacing fabric. The interfacing fabric is made of strong polyester fibers that can stretch considerably before ripping. Furthermore, the interfacing fabric is thin being approximately 0.2 mm thick and white in color. The interfacing fabric layer 54 is thin enough to allow a trocar or Veress needle to puncture through the fabric when using an entry tactic other than a Hasson cut down technique and capable of being cut when employing the Hasson cut down technique. At the linea alba location, the posterior rectus sheath layer 54 in the model represents the fascia of both the anterior and posterior rectus sheath that come together at the linea alba. The fabric of the posterior rectus sheath layer 54 represents the linea alba configured by exposing the posterior rectus sheath layer through and by way of an elongate opening 68 formed in anterior rectus sheath layer 46, first rectus muscle layer 48, second rectus muscle layer 50 and third rectus muscle layer 52. The elongate opening 68 in each of these layers are shown in FIG. 17. In a first entry technique employing the Hasson cut down method, the fascia of the linea alba as represented by the posterior rectus sheath layer 54 is grasped and pulled through the incision in order to safely incise the layer 54. Hence, the stretchable fabric layer 54 advantageously provides ability to pull the fascia layer up so that safe cutting techniques may be practiced using this model.

The *transversalis* fascia layer 56 is made of cellular polyethylene foam that is white in color and approximately 0.25 inches thick. The fascia layer 56 has a cellular texture arising from the cellular polyethylene foam as opposed to the solid EVA foam layers. The peritoneum layer 58 is made of solid EVA foam that is white in color and approximately 1 millimeter thick. The peritoneum layer 58 may also be made of silicone or TPE. The optional inferior epigastric vein and artery layer 60 layer includes solid or hollow elongate cylindrical structures made of silicone or Kraton® polymer or other elastomer having a cross-sectional diameter of approximately 0.15 inches. The arteries are red in color and the veins are blue in color. The layers, as described above, provide an optical entry with a very realistic appearance to the end user. The layers of foam are capable of being punctured with a trocar and look realistic under optical entry via a laparoscope inserted into an optical trocar. Also, the foam layers provide a realistic tactile feedback to the practitioner when using Veress needle entry as well as with optical entry. The thicknesses, colors and compositions of the various layers of the abdominal wall of the first entry model 10 are shown in Table 1 below.

TABLE 1

| Abdominal Wall Layers | | | | |
|---|---|---|---|---|
| Layer | Material | Thickness Standard model | Thickness Obese model | Color |
| Skin | Silicone or TPE | 0.1" | 0.1" | Flesh Tone |
| Fat | Cellular Foam Memory Foam TPE with Additive Gel | 1.5 to 4.0 cm | 4.0 to 7.0 cm | Yellow |
| Anterior Rectus Sheath | Solid Foam | 1 mm | 1 mm | White |
| Rectus Muscle | Solid Foam | 1 mm | 1 mm | Red |
| Rectus Muscle | Cellular Foam | ¼" | ¼" | Pink or White |
| Rectus Muscle | Solid Foam | 1 mm | 1 mm | Red |
| Posterior Rectus Sheath | Interfacing Fabric | 0.2 mm | 0.2 mm | White |
| Transversalis Fascia | Cellular Foam | ¼" | ¼" | White |
| Peritoneum | Solid Foam, Silicone or TPE | 1 mm | 1 mm | White |

Turning now to FIG. 17, there is shown a top planar view that is representative of the anterior rectus sheath layer 46, first rectus muscle layer 48, the second rectus muscle layer 50 and the third rectus muscle layer 52. These layers are approximately six inches wide and six and a half inches long. The anterior rectus sheath layer 46, first rectus muscle layer 48, the second rectus muscle layer 50 and the third rectus muscle layer 52 all have an elongate opening 68. The elongate opening 68 extends along the center line of the layers and is shown in FIG. 17 to be a substantially rectangular cut out that is approximately one inch wide and approximately 5.75 inches long. The elongate opening 68 represents the lack of muscle at the linea alba. However, the linea alba varies between patients and in other variations of the model, the width of the elongate opening 68 can range from 8 mm to 30 mm. Of course, the shape of the opening may also vary. When the layers 46, 48, 50, 52 are overlaid, one on top of the other, all of the respective openings 68 are aligned. When the layers 46, 48, 50, 52 are overlaid with the other layers 44, 54, 56, 58, the ovular holes 66 (described with respect to FIG. 18) are in communication or alignment with the elongate openings 68 and slits 104 (described with respect to FIG. 19). The posterior rectus sheath 54 is visible through the aligned elongate openings 68 simulating the appearance of the linea alba of the abdomen.

Figure 18:
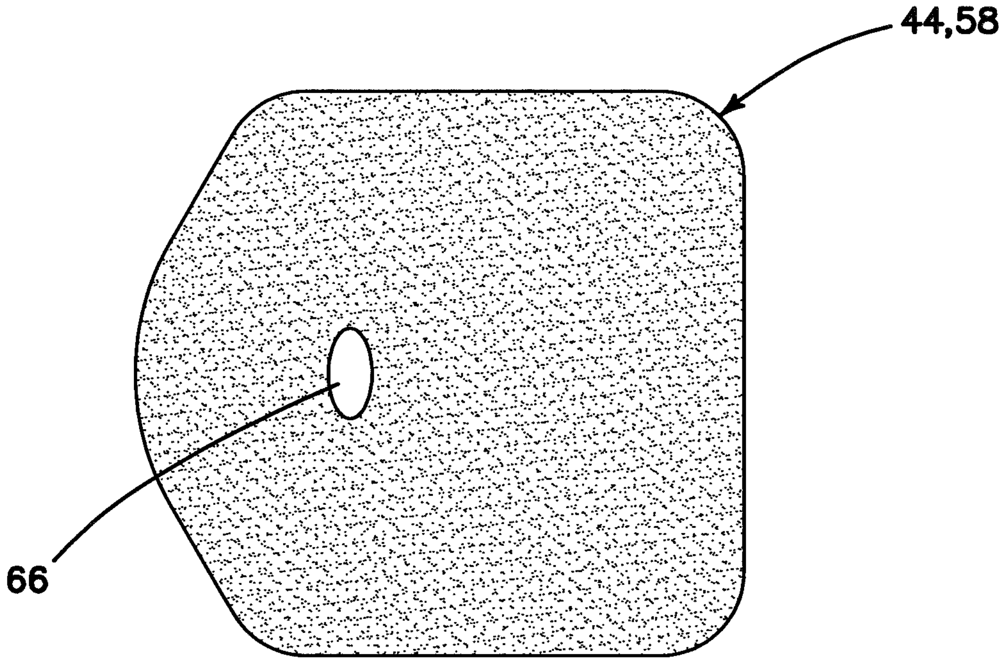
FIG. 18 is a top planar view that is representative of more than one layer in an anatomical portion of a first entry model according to the present invention.

Turning now to FIG. 18, there is shown a top planar view that is representative of the fat layer 44 and the peritoneum layer 58. These layers are approximately six inches wide and six and a half inches long. The fat layer 44 and the peritoneum layer 58 all have an ovular hole 66 that has a length of approximately one inch and a width of approximately 0.5 inches. The ovular hole 66 is located approximately two inches from one side and is in the same location in the fat layer 44 and the peritoneum layer 58 such that when overlaid the ovular holes 66 line up to provide a pathway for the umbilical stalk 42 across these layers. The ovular hole 66 closely hugs the umbilical stalk 42 compared with a circular hole advantageously providing a more realistic visualization.

Figure 19:
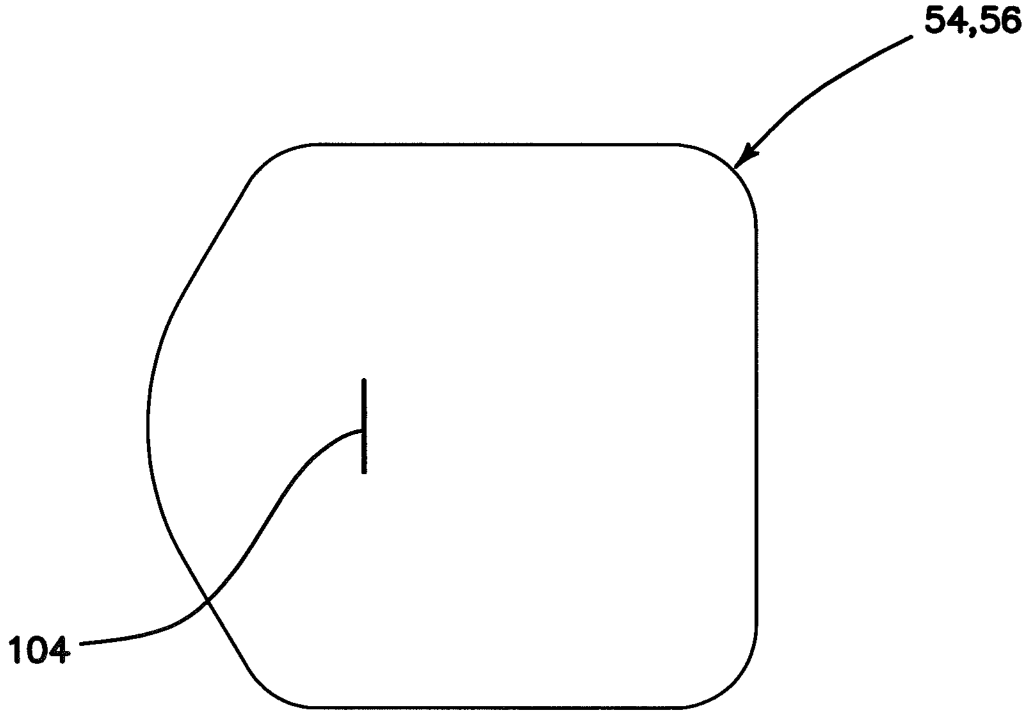
FIG. 19 is a top planar view that is representative of more than one layer in an anatomical portion of a first entry model according to the present invention.

Turning now to FIG. 19, there is shown a top planar view that is representative of the posterior rectus sheath layer 54 and the *transversalis* fascia layer 56. These layers 54, 56 include a slit 104. The slit 104 is approximately 1 inch in length and is a narrow cut substantially perpendicular to the representative linea alba so that the ends of the slit 104 are not aligned with the longitudinal axis of the linea alba. The slit 104 allows the umbilical stalk 42 to pass through to its termination between the *transversalis* fascia layer 56 and the peritoneum layer 58 while still allowing these layers to touch or closely approximate the curvature of the umbilical stalk 42. In this configuration, the posterior rectus sheath layer 54 and the *transversalis* fascia layer 56 closely hug the umbilical stalk 42 which advantageously makes the visualization more realistic such that these layers are seen or felt during entry especially when employing a Hasson or Veress needle first entry. In one variation in which the fat layer 44 comprises more than one layer, the one or more distal fat layer(s) 44 are also configured with a slit 104 as shown in FIG. 19; whereas the proximal fat layer(s) 44 are configured with an ovular hole 66 as shown in FIG. 18.

In another variation, the first entry model 10 includes simulations for adhesions present in real anatomy. Frequently, organs and tissues located underneath the peritoneum will adhere to the peritoneum and create an adhesion. While practicing first entry techniques, it is necessary for the surgeon to learn how to be wary of adhesions and how to navigate with respect to them in the event they occur in the patient. The present invention provides a first entry model that allows the surgeon to practice encountering and navigating adhesions in a first entry laparoscopic environment. It is necessary for the surgeon to be careful, because aggressive entry in the location of an adhesion may result in accidental piercing of the adhered tissue or organ. In this variation of the first entry model 10, adhesions are included in the model. For example, a simulated adhesion is a piece of simulated bowel that is attached to the undersurface of the peritoneum layer 58. The piece of simulated bowel is made of silicone. The adhesion may be made of any suitable material and adhesive may be used to connect the adhesion to the peritoneum layer 58. In another variation, a piece of silicone is used to attach the simulated bowel to the peritoneum layer 58. In the first entry model with adhesions, the peritoneum layer 58 may be made of silicone or TPE instead of foam in order to more easily attach a silicone adhesion to the peritoneum layer 58. Also, the peritoneum layer 58 that is made of silicone or TPE will stretch as the adhesion is being removed making the simulation more realistic. To signify that an adhesion is present, a scar indicating a previous surgery may be molded or printed onto the surface of the skin layer 40 in a location above the adhesion to the peritoneum layer; thereby, the surgeon would anticipate an adhesion being present in the general area beneath the layers in the abdominal cavity. The scar would require the practitioner to make a decision about the best place to enter or pierce the first entry model 10 and thus adds an important practice dimension to the model 10. A scar may or may not be provided. If a scar is not provided on the skin layer 40, an adhesion may still be provided to surprise the practitioner adding yet another practice dimension to the first entry model 10. Generally, after the surgeon has entered and found the adhesion, the surgeon can insert a grasper to pull at the adhesion such as a piece of bowel, stretch the adhesion away from the peritoneum and/or bowel, and use a scalpel or scissors to cut through the silicone that is located between the bowel and peritoneum layer 58 and used to attach the simulated adhesion to the peritoneum layer 58 in order to free the adhesion.

The first entry model 10 of the present invention is particularly suited for laparoscopic procedures and may be employed with a laparoscopic trainer 20; however, the invention is not so limited and the first entry model 10 of the present invention can be used alone to practice first entry surgical procedures equally effectively. The present invention advantageously provides numerous practice possibilities for the surgeon who is learning or practicing first entry techniques while at the same time being manufactured of simple silicone and foam materials providing maximum costs savings while also providing a most realistic tactile and visual experience. The first entry model 10 may be used repeatedly allowing the surgeon to practice numerous entry techniques on the same model before discarding the model which can then be easily replaced with a new model when used with the laparoscopic trainer.

It is understood that various modifications may be made to the embodiments of the first entry model 10 disclosed herein. Therefore, the above description should not be construed as limiting, but merely as exemplifications of preferred embodiments. Those skilled in the art will envision other modifications within the scope and spirit of the present disclosure.

We claim:

1. A first entry model for practicing first entry surgical procedures, the first entry model comprising an anatomical portion configured to connect to a support to form a substantially planar or dome-shaped configuration; the anatomical portion having a plurality of anatomical layers and a tubular structure connected to an uppermost layer of the anatomical portion and penetrating through at least one or more anatomical layers beneath the uppermost layer of the anatomical portion; the anatomical portion being captured between two frame elements adapted for attaching to a laparoscopic surgical training device.

2. The first entry model of claim 1 wherein the support is configured to encompass and connect to a perimeter of the anatomical portion so as to hold the plurality of anatomical layers.

3. The first entry model of claim 1 wherein the support comprises a frame having opposed top and bottom frame elements; the opposed top and bottom frame elements defining top and bottom frame openings.

4. The first entry model of claim 3 wherein the opposed top and bottom frame elements are configured to snap together such that a perimeter of the anatomical portion is captured between the top and bottom frame elements.

5. The first entry model of claim 3 wherein the top frame element comprises protrusions that snap through a perimeter of the anatomical portion and into apertures formed in the bottom frame element.

6. The first entry model of claim 3 wherein a center-located area of the anatomical portion is penetrable from the uppermost layer to a lowermost layer of the anatomical portion through the top and bottom openings of the frame.

7. The first entry model of claim 1 wherein the support is made of plastic material which is sufficiently rigid to provide structural support and maintain the substantially planar or dome-shaped configuration while allowing penetration from one side to another side of the anatomical portion.

8. The first entry model of claim 1 wherein the plurality of anatomical layers comprises a simulated skin layer a simulated fat layer, a simulated anterior rectus sheath layer, a simulated first rectus muscle layer, a simulated second rectus muscle layer, a simulated third rectus muscle layer, a simulated posterior rectus sheath layer, a simulated transversalis fascia layer, and a simulated peritoneum layer.

9. The first entry model of claim 8 wherein the simulated skin layer comprises the uppermost layer and the simulated peritoneum layer comprises a lowermost layer of the anatomical portion with the tubular structure representing a simulated umbilical stalk.

10. The first entry model of claim 9 wherein the simulated umbilical stalk penetrates through all the layers beneath the simulated skin layer or penetrates through all the layers beneath the simulated skin layer except for the peritoneum layer.

11. The first entry model of claim 9 wherein the simulated umbilical stalk comprises an umbilical portion formed integrally with the simulated skin layer and an umbilical shaft; the umbilical portion having a proximal end connected to the simulated skin layer and a distal opening at a distal end.

12. The first entry model of claim 11 wherein a proximal end of the umbilical shaft is attached to the distal opening of the umbilical portion and a distal end of the umbilical shaft is selected from the group consisting of left free meeting the simulated peritoneum layer, attached with adhesive to the simulated peritoneum layer and integrally molded with the simulated peritoneum layer, if the simulated umbilical stalk penetrates through all the layers beneath the simulated skin layer.

13. The first entry model of claim 11 wherein a proximal end of the umbilical shaft is attached to the distal opening of the umbilical portion and a distal end of the umbilical shaft includes four or more cuts extending toward the proximal end of the umbilical shaft to form four or more flaps which are adhered to a distal-facing surface of the simulated transversalis fascia layer, if the simulated umbilical stalk penetrates through the layers beneath the simulated skin layer except for the simulated peritoneum layer.

14. The first entry model of claim 11 wherein the umbilical portion having a first lumen and the umbilical shaft having a second lumen; wherein the umbilical portion and umbilical shaft are attached with adhesive such that the first lumen and second lumen interconnect.

15. The first entry model of claim 14 wherein the first lumen and the second lumen have the same diameter.

16. The first entry model of claim 1 wherein the laparoscopic trainer comprises a base and a top cover connected to and spaced apart from the base to define an internal cavity between the top cover and the base; the top cover having an opening that serve as a connecting port for the first entry model.

17. The first entry model of claim 16 wherein the first entry model having a shape conforming to a shape of the opening, allowing the first entry model to be inserted into the opening and being secured to the laparoscopic trainer via connecting elements of the support.

18. The first entry model of claim 16 wherein an insert is sized and configured to be removably fitted into the opening of the top cover; the insert having a plurality of apertures and the first entry model having a shape conforming to a shape of at least one aperture of the plurality of apertures, allowing the first entry model to be inserted into the aperture and being secured to the laparoscopic trainer via connecting elements of the support.

19. The first entry model of claim 1 wherein the first entry model is made in a polygonal shape or a circular shape; the first entry model having five sides forming a slightly elongated shape with one side being curved outwardly in a generally U-shaped configuration, if the first entry model is made in a polygonal shape.

20. The first entry model of claims 1 wherein the first entry model is further configured to be hand-held for sales demonstration purposes.

* * * * *